(12) United States Patent
Lee et al.

(10) Patent No.: US 12,506,859 B2
(45) Date of Patent: Dec. 23, 2025

(54) WEARABLE ELECTRONIC DEVICE COMPRISING SENSOR AND OPERATION METHOD THEREOF

(71) Applicant: Samsung Electronics Co., Ltd., Suwon-si (KR)

(72) Inventors: Donghan Lee, Suwon-si (KR); Jongah Kim, Suwon-si (KR); Heewoong Yoon, Suwon-si (KR); Kihyuk Lee, Suwon-si (KR); Gwangho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/058,876

(22) Filed: Feb. 20, 2025

(65) Prior Publication Data

US 2025/0193367 A1 Jun. 12, 2025

Related U.S. Application Data

(63) Continuation of application No. PCT/KR2023/014386, filed on Sep. 21, 2023.

(30) Foreign Application Priority Data

Oct. 7, 2022 (KR) .................. 10-2022-0128988
Nov. 1, 2022 (KR) .................. 10-2022-0143937

(51) Int. Cl.
*H04N 13/366* (2018.01)
*H04N 13/117* (2018.01)
(Continued)

(52) U.S. Cl.
CPC ......... *H04N 13/366* (2018.05); *H04N 13/117* (2018.05); *H04N 13/344* (2018.05); *H04N 13/398* (2018.05)

(58) Field of Classification Search
None
See application file for complete search history.

(56) References Cited

U.S. PATENT DOCUMENTS 11,386,872 B2 * 7/2022 Cahill .................. A63F 13/63
2012/0127062 A1 5/2012 Bar-zeev et al.
(Continued)

FOREIGN PATENT DOCUMENTS

JP 2015095045 A 5/2015
JP 6747504 B2 8/2020
(Continued)

OTHER PUBLICATIONS

International Search Report for PCT/KR2023/014386 mailed Dec. 29, 2023, 5 pages with English translation.
(Continued)

*Primary Examiner* — Talha M Nawaz
(74) *Attorney, Agent, or Firm* — Nixon & Vanderhye, P.C.

(57) ABSTRACT

An example wearable electronic device may include glass; a display which displays a virtual object through the glass; a first sensor disposed in a first region of the wearable electronic device; a second sensor disposed in a second region of the wearable electronic device; a memory; and at least one processor, wherein the memory stores at least one instruction which, when executed, causes the wearable electronic device to control the display to display a virtual object at a first location through the glass; acquire movement information of the first region through the first sensor and acquire movement information of the second region through the second sensor; and control the display to display the virtual object at a second location different from the first location based on the movement information of the first region and the movement information of the second region.

20 Claims, 12 Drawing Sheets

(51) Int. Cl.
*H04N 13/344* (2018.01)
*H04N 13/398* (2018.01)

(56) References Cited

U.S. PATENT DOCUMENTS

| | | |
|---|---|---|
| 2015/0213778 A1 | 7/2015 | Moravetz |
| 2016/0189429 A1* | 6/2016 | Mallinson ............ G02B 27/017 345/633 |
| 2016/0252725 A1 | 9/2016 | Ko et al. |
| 2016/0282619 A1 | 9/2016 | Oto et al. |
| 2017/0276943 A1 | 9/2017 | Osman |
| 2017/0345194 A1* | 11/2017 | Park ........................ A63F 13/42 |
| 2018/0011317 A1* | 1/2018 | Hasegawa ............. G06F 3/0481 |
| 2019/0102956 A1 | 4/2019 | Ishihara et al. |
| 2019/0221043 A1* | 7/2019 | Kopper .................... A61B 6/03 |
| 2019/0377474 A1* | 12/2019 | Neeter ................. G02B 27/017 |
| 2020/0135150 A1* | 4/2020 | Sugihara ................... G09G 5/10 |
| 2020/0242361 A1 | 7/2020 | Profendiner |
| 2021/0034161 A1 | 2/2021 | Potts et al. |
| 2021/0239993 A1 | 8/2021 | Wan et al. |
| 2021/0356743 A1 | 11/2021 | Muldoon et al. |
| 2022/0036779 A1 | 2/2022 | Nishibe et al. |
| 2022/0317445 A1 | 10/2022 | Nicholson et al. |

FOREIGN PATENT DOCUMENTS

| | | | |
|---|---|---|---|
| KR | 20130126623 A | 11/2013 | |
| KR | 20150074757 A | 7/2015 | |
| KR | 20190102777 A | 9/2019 | |
| KR | 20220001666 A | 1/2022 | |
| WO | WO-2019163129 A1 * | 8/2019 | .............. G06F 3/011 |
| WO | 2020071029 A1 | 4/2020 | |

OTHER PUBLICATIONS

Written Opinion of the ISA for PCT/KR2023/014386 mailed Dec. 29, 2023, 7 pages.

* cited by examiner

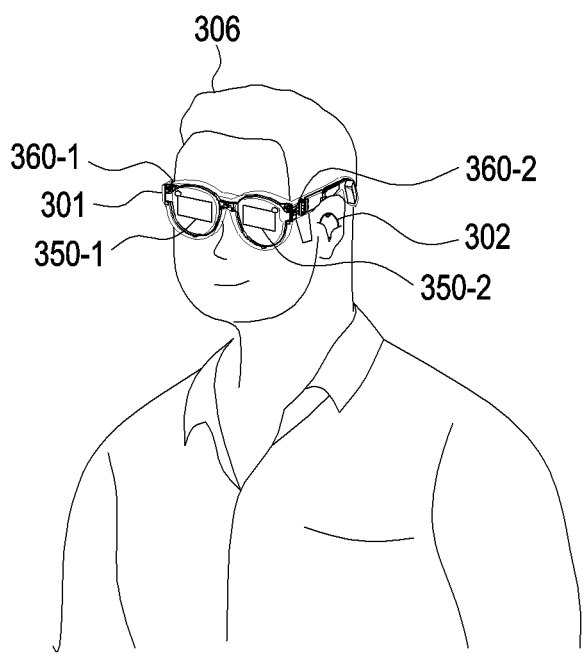
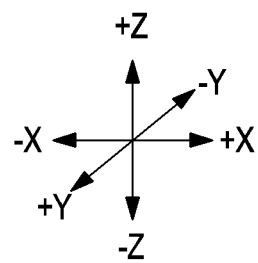
FIG. 3B-1
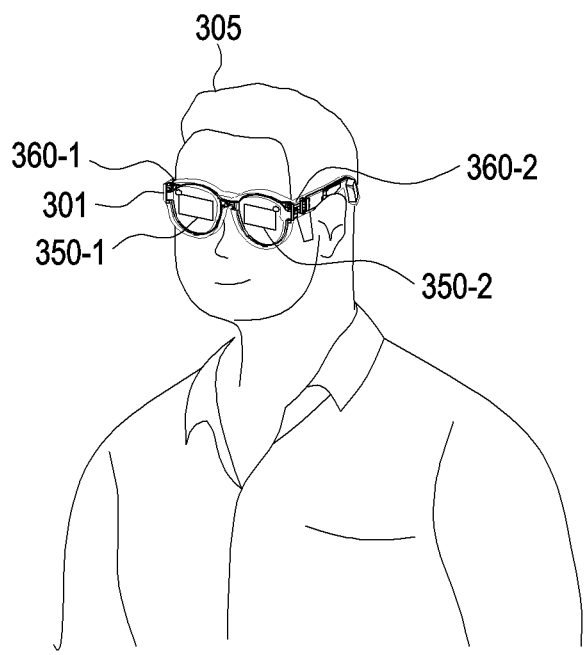
FIG. 3B-2

WEARABLE ELECTRONIC DEVICE COMPRISING SENSOR AND OPERATION METHOD THEREOF

CROSS-REFERENCE TO RELATED APPLICATIONS

This application is a continuation of International Application No. PCT/KR2023/014386, designating the United States, filed on Sep. 21, 2023, in the Korean Intellectual Property Receiving Office and claiming priority to Korean Patent Application Nos. 10-2022-0128988, filed on Oct. 7, 2022, and 10-2022-0143937, filed on Nov. 1, 2022, in the Korean Intellectual Property Office, the disclosures of each of which are incorporated by reference herein in their entireties.

BACKGROUND

Field

The disclosure relates to a wearable electronic device including a sensor and an operation method thereof.

Description of Related Art

Various services and additional functions provided through wearable electronic devices, such as an augmented reality glasses devices have increased.

An augmented reality glasses device is a wearable device worn on a user's head and may provide augmented reality services to the user by providing visual information through a display.

SUMMARY

According to an example embodiment, a wearable electronic device may include a glass member, a display configured to display a virtual object through the glass member, a first sensor disposed in a first region of the wearable electronic device, a second sensor disposed in a second region of the wearable electronic device, a memory, and at least one processor. According to an example embodiment, the memory may store at least one instruction which, when executed by the at least one processor, causes the wearable electronic device to display a virtual object at a first location through the glass member in a state in which the wearable electronic device is worn by a user; acquire movement information of the first region through the first sensor and acquire movement information of the second region through the second sensor, based on movement of the wearable electronic device, corresponding to movement of the user; and display the virtual object at a second location different from the first location, based on the movement information of the first region and the movement information of the second region.

According to an example embodiment, an operation method of a wearable electronic device may include display a virtual object at a first location through a glass member included in the wearable electronic device in a state in which the wearable electronic device is worn by a user; acquiring movement information of a first region through a first sensor disposed in the first region of the wearable electronic device and acquire movement information of a second region through a second sensor disposed in the second region of the wearable electronic device, based on movement of the wearable electronic device, corresponding to movement of the user; and display the virtual object at a second location different from the first location, based on the movement information of the first region and the movement information of the second region.

According to an example embodiment, a non-transitory computer-readable recording medium may include at least one instruction which, when executed, may cause a wearable electronic device to perform operations including displaying a virtual object at a first location through a glass member included in the wearable electronic device in a state in which the wearable electronic device is worn by a user; acquiring movement information of a first region through a first sensor disposed in the first region of the wearable electronic device and acquire movement information of a second region through a second sensor disposed in the second region of the wearable electronic device, based on movement of the wearable electronic device, corresponding to movement of the user; and displaying the virtual object at a second location different from the first location, based on the movement information of the first region and the movement information of the second region.

According to an example embodiment, a first wearable electronic device may include a glass member, a display configured to display a virtual object through the glass member, a first sensor, a communication circuit, a memory, and at least one processor. According to an example embodiment, the memory may store at least one instruction which, when executed by the at least one processor, causes the first wearable electronic device to display a virtual object at a first location through the glass member in a state where the first wearable electronic device is worn by a user; acquire first movement information through the first sensor, based on movement of the first wearable electronic device, corresponding to movement of the user; and acquire second movement information from a second wearable electronic device worn by the user through the communication circuit, the second movement information including a value acquired through a second sensor included in the second wearable electronic device, based on movement of the second wearable electronic device, corresponding to the movement of the user; and to display the virtual object at a second location different from the first location, based on the movement information of the first region and the movement information of the second region.

According to an example embodiment, an operation method of a first wearable electronic device may include display a virtual object at a first location through a glass member included in the first wearable electronic device in a state where the first wearable electronic device is worn by a user; acquiring first movement information through a first sensor included in the first wearable electronic device, based on movement of the first wearable electronic device, corresponding to the movement of the user; acquiring second movement information from a second wearable electronic device worn by the user through the communication circuit, the second movement information including a value acquired through a second sensor included in the second wearable electronic device, based on movement of the second wearable electronic device, corresponding to the movement of the user; and displaying the virtual object at a second location different from the first location, based on the movement information of the first region and the movement information of the second region.

According to an example embodiment, a non-transitory computer-readable recording medium may include at least one instruction which, when executed, may cause a first wearable electronic device to perform operations including displaying a virtual object at a first location through a glass member included in a first wearable electronic device in a state in which the first wearable electronic device is worn by a user; acquiring first movement information through a first sensor included in the first wearable electronic device, based on movement of the first wearable electronic device, corresponding to the movement of the user; acquiring second movement information from a second wearable electronic device worn by the user through the communication circuit, the second movement information including a value acquired through a second sensor included in the second wearable electronic device, based on movement of the second wearable electronic device, corresponding to the movement of the user; and displaying the virtual object at a second location different from the first location, based on the movement information of the first region and the movement information of the second region.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3B-1 and FIG. 3B-2 are a view illustrating an example wearable electronic device worn by a user according to various embodiments;

DETAILED DESCRIPTION

Figure 1:
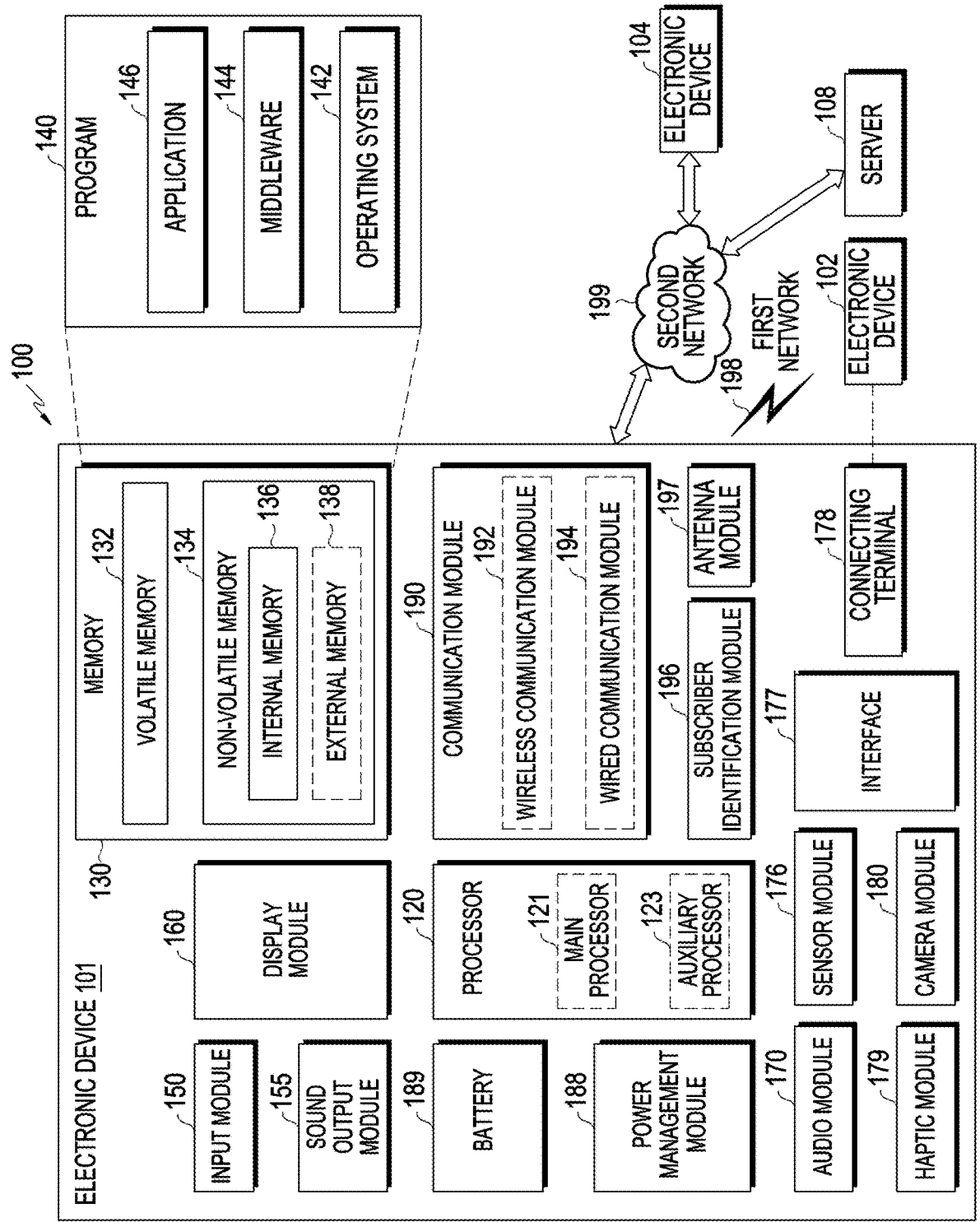
FIG. 1 is a block view illustrating an example electronic device in a network environment according to various embodiments.

Hereinafter, example embodiments of the disclosure will be described with reference to accompanying drawings so as to be easily realized by a person having an ordinary knowledge in the art to which the disclosure pertains. However, the disclosure may be realized in many different forms and should not be construed as being limited to the embodiments disclosed herein. In connection with a description of the drawings, like or similar reference numerals may be used for like or similar elements. Furthermore, in the drawings and descriptions related thereto, descriptions of well-known functions and configurations may be omitted for clarity and brevity.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 (including, e.g., processing circuitry) may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). For example, the various processors may operate individually or collectively to perform operations or functions. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 (including, e.g., input circuitry) may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 (including, e.g., sound output circuitry) may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 (including, e.g., audio circuitry) may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 (including, e.g., interface circuitry) may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 (including, e.g., a camera) may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 (including, e.g., communication circuitry) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (including, e.g., wireless communication circuitry) (e.g., a cellular communication module, a short-range wireless communication module, or a global navigation satellite system (GNSS) communication module) or a wired communication module 194 (including, e.g., wired communication circuitry) (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
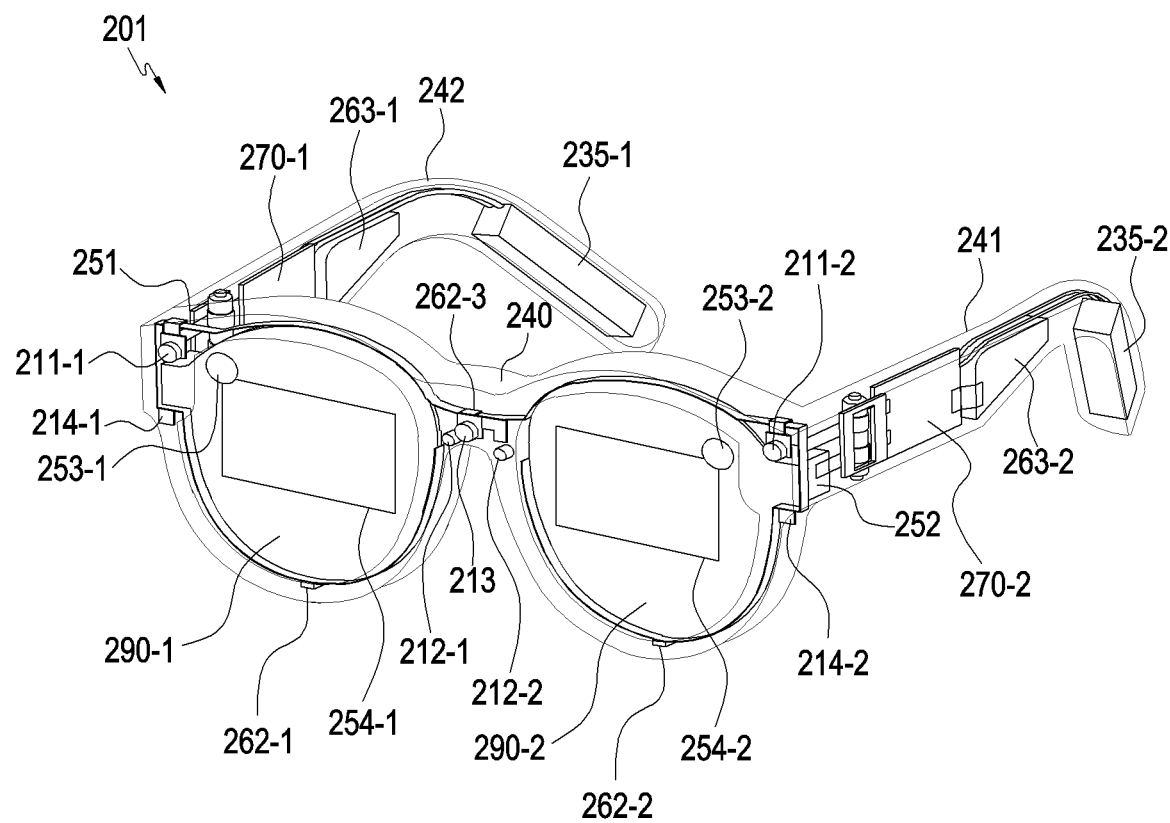
FIG. 2 is a view illustrating a structure of an example glasses-type wearable device according to various embodiments.

FIG. 2 is a view illustrating a structure of an example glasses-type wearable device according to various embodiments.

Referring to FIG. 2, the glasses-type wearable device 201 may include at least one light-emitting element 214-1 or 214-2. According to an embodiment, the light-emitting element 214-1 or 214-2 may be different from a light source, described below, configured to emit light to a screen output region of the display. According to an embodiment, the light-emitting element 214-1 or 214-2 may emit light for facilitating pupil detection when detecting the pupil of the user by using at least one second camera 212-1 or 212-2. According to an embodiment, each light-emitting element 214-1 or 214-2 may include an LED. According to an embodiment, the light-emitting element 214-1 or 214-2 may emit light in the infrared range. According to an embodiment, the light-emitting element 214-1 or 214-2 may be attached around a frame of the glasses-type wearable electronic device 201. According to an embodiment, the light-emitting element 214-1 or 214-2 may be located around at least one first camera 211-1 or 211-2 and may assist with gesture detection, head tracking, and spatial recognition by the at least one first camera 211-1 or 211-2 when the glasses-type wearable device 201 is used in a dark environment. According to an embodiment, the light-emitting element 214-1 or 214-2 may be located around at least one third camera 213 and may assist with image acquisition by the at least one third camera 213 when the glasses-type wearable device 201 is used in a dark environment.

According to an embodiment, the glasses-type wearable device 201 may include a battery 235-1 or 235-2. The battery 235-1 or 235-2 may store power for operating other components of the glasses-type wearable device 201.

According to an embodiment, the glasses-type wearable device 201 may include a first display 251, a second display 252, at least one input optical member 253-1 or 253-2, at least one transparent member 290-1 or 290-2, and at least one screen display portion 254-1 or 254-2. According to an embodiment, the first display 251 and the second display 252 may include, for example, a liquid crystal display (LCD), a digital mirror device (DMD), a liquid crystal on silicon (LCoS), an organic light-emitting diode (OLED), or a micro light emitting diode (micro-LED). According to an embodiment, in a case that the first display 251 and the second display 252 include one of a liquid crystal display, a digital mirror device, or a liquid crystal on silicon, the glasses-type wearable device 201 may include a light source configured to emit light to a screen output region of the display. According to an embodiment, in a case that the first display 251 and the second display 252 are capable of generating light on their own (e.g., when made of one of an organic light emitting diode or a micro LED), the glasses-type wearable device 201 may provide a relatively good quality virtual image to the user even if the glasses-type wearable device does not include a separate light source.

According to an embodiment, the at least one transparent member 290-1 or 290-2 may be disposed to face the eye of the user when the user is wearing the glasses-type wearable device 201. According to an embodiment, the at least one transparent member 290-1 or 290-2 may include at least one of a glass plate, a plastic plate, or polymer. According to an embodiment, when wearing the glasses-type wearable device 201, the user may see the outside world through the at least one transparent member 290-1 or 290-2. According to an embodiment, the at least one input optical member 253-1 or 253-2 may guide light generated by the first display 251 and the second display 252 to the user's eye. According to an embodiment, an image based on light generated by the first display 251 and the second display 252 may be formed on the at least one screen display portion 254-1 or 254-2 on the at least one transparent member 290-1 or 290-2, and the user may see the image formed on the at least one screen display portion 254-1 or 254-2.

According to an embodiment, the glasses-type wearable device 201 may include at least one optical waveguide (not shown). According to an embodiment, the at least one optical waveguide may transfer light generated by the first display 251 and the second display 252 to the user's eye. The glasses-type wearable device 201 may include one optical waveguide each corresponding to a left eye and a right eye. According to an embodiment, the optical waveguide may include at least one of glass, plastic, or polymer. According to an embodiment of the disclosure, the optical waveguide may include a nanopattern, for example, a grating structure having a polygonal or curved surface shape disposed on a surface inside or outside thereof. According to an embodiment, the optical waveguide may include a free-form prism, and, in this case, the optical waveguide may direct the incident light to the user through a reflective mirror. According to an embodiment of the disclosure, the optical waveguide may include at least one diffractive element (e.g., a diffractive optical element (DOE) or a holographic optical element (HOE)) or at least one reflective element (e.g., a reflective mirror), and may guide display light emitted from the light source to the user's eye by using the at least one diffractive element or reflective element included in the optical waveguide. According to an embodiment, the diffractive element may include an input/output optical member. According to an embodiment, the reflective element may include a member causing total reflection.

According to an embodiment, the glasses-type wearable device 201 may include at least one voice input device 262-1, 262-2, or 262-3 and at least one voice output device 263-1 or 263-2.

According to an embodiment, the glasses-type wearable device 201 may include a first PCB 270-1 and a second PCB 270-2. The first PCB 270-1 and the second PCB 270-2 may be configured to transfer an electrical signal to a component included in the glasses-type wearable device 201. According to an embodiment, the first PCB 270-1 and the second PCB 270-2 may include a flexible printed circuit board (FPCB). According to an embodiment, the first PCB 270-1 and the second PCB 270-2 each may include a first substrate, a second substrate, and an interposer disposed between the first substrate and the second substrate.

Figure 3A:
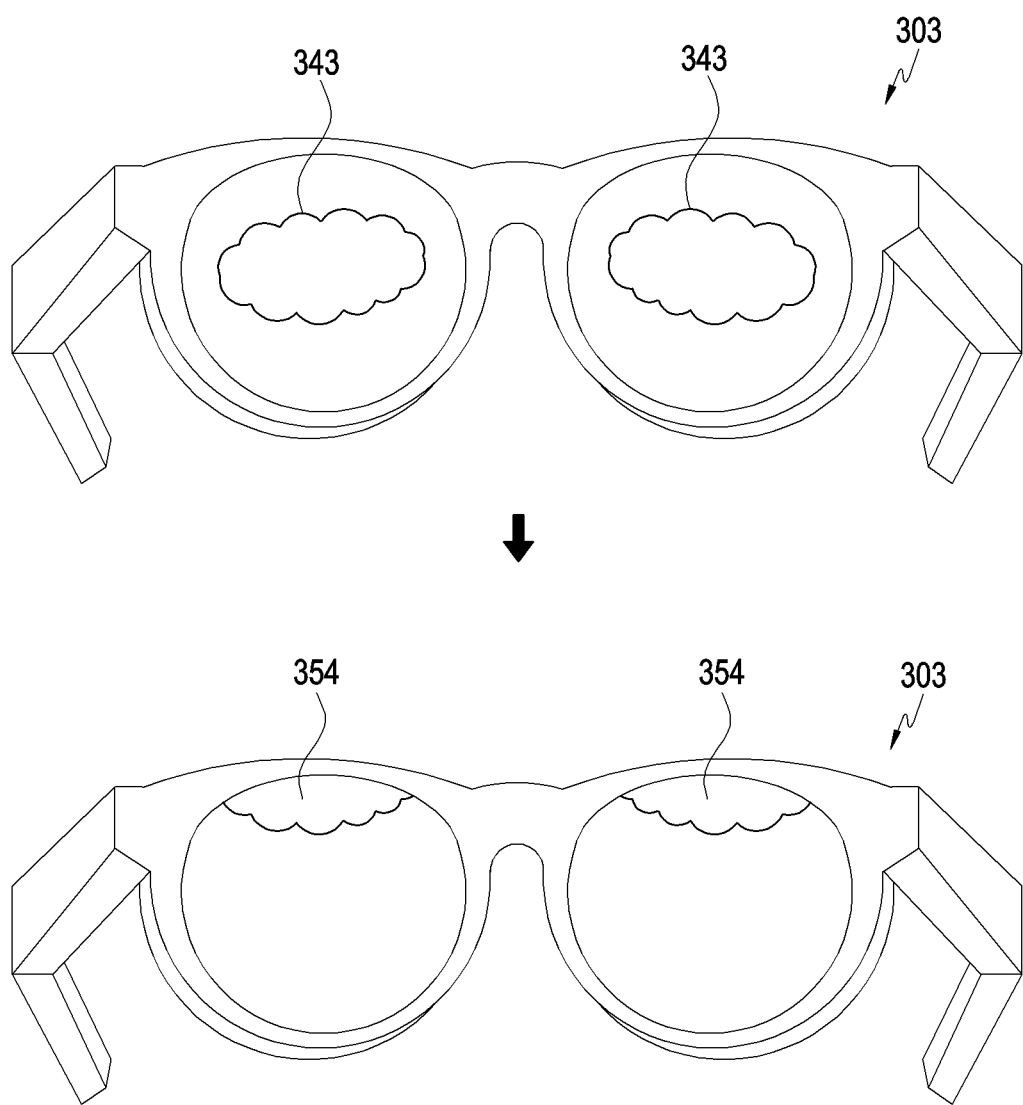
FIG. 3A is a view illustrating a conventional wearable electronic device displaying a virtual object through a glass member according to movement of a user according to a comparative example.

FIG. 3A is a view illustrating a conventional wearable electronic device displaying a virtual object through a glass member according to movement of a user according to a comparative example.

The wearable electronic device 303 may display the virtual object 343 through a glass member.

In a case that the wearable electronic device 303 is not closely fixed to the user's body, the wearable electronic device 303 may move according to movement of the user wearing the wearable electronic device 303.

According to the comparative example, when the wearable electronic device 303 moves in response to the movement of the user, only a portion 354 of the virtual object may be displayed through the glass member. For example, in a case that the wearable electronic device 303 is moved up or down relative to a normal wearing state, the user may only see the portion 354 of the virtual object through the glass member of the wearable electronic device 303.

Therefore, in a case that the glasses-type wearable electronic device 303 is not closely fixed to the user's body, the conventional wearable electronic device 303 may be moved up or down according to the movement of the user, thus causing a problem that the user may only see a portion of the virtual object through the glass member.

FIGS. 3B-1 and 3B-2 are views illustrating an example wearable electronic device worn by a user according to various embodiments.

Referring to FIGS. 3B-1 and 3B-2, the wearable electronic device 301 (e.g., the electronic device 101 in FIG. 1 or the glasses-type wearable device 201 in FIG. 2) according to an embodiment may display an augmented reality (AR) image through a display including a glass member 350-1 or 350-2 (e.g., 254-1 or 254-2 in FIG. 2). For example, the wearable electronic device 301 may display information associated with a real thing (or object) as a virtual object (e.g., an AR image) around the real thing. For example, the user wearing the wearable electronic device 301 may see the virtual image (or virtual object) displayed by the wearable electronic device 301 together with the real space through the display 360-1 or 360-2 (e.g., 160 in FIG. 1 or 251 or 252 in FIG. 2) configured to display a content or object through the glass member 350-1 or 350-2. By way of example, the wearable electronic device 301 may be realized as smart glasses or a head-mounted display device.

According to an embodiment, the wearable electronic device 301 may display a virtual object at a first location through the glass member 350-1 or 350-2. For example, the first location may indicate a location at which a virtual object is displayed among the entire region (e.g., a visible region) which the user may see through the glass member 350-1 or 350-2.

According to an embodiment, in a case that the wearable electronic device 301 is not closely fixed to the body of the user 305 or 306, the wearable electronic device 301 may move according to movement of the user 305 or 306 wearing the wearable electronic device 301. For example, according to the movement of the user, the wearable electronic device 301 may move in at least one of an up, down, left, and right direction.

Referring to FIG. 3B-2, the wearable electronic device 301 according to an embodiment may acquire first movement information (or a first sensing value) from a sensor disposed in a first region (e.g., 240 in FIG. 2) of the wearable electronic device 301 and second movement information (or a second sensing value) from a sensor disposed in a second region (e.g., 241 or 242 in FIG. 2), based on the movement of the wearable electronic device 301 corresponding to the movement of the user 305 wearing the wearable electronic device 301. According to an embodiment, the wearable electronic device 301 may display a virtual object having been displayed at the first location at a second location different from the first location, based on the first movement information (or first sensing value) and the second movement information (or second sensing value). By way of example, the wearable electronic device 301 may change the location for displaying a virtual object from the first location to the second location when it is determined that there is a predesignated significant difference between the first sensing value and the second sensing value. For example, the second location may be determined based on a difference between the first sensing value and the second sensing value. For example, the second location may indicate a location different from the first location, at which a virtual object may be displayed among the entire region (e.g., a visible region) which the user may see through the glass member 350-1 or 350-2.

Referring to FIG. 3B-1, the wearable electronic device 301 according to an embodiment may be communicatively connected to an external electronic device 302 (e.g., the electronic device 102 or 104 in FIG. 1). According to an embodiment, the external electronic device 302 may include a wearable electronic device wearable on the ear of the user 306.

According to an embodiment, the wearable electronic device 301 may acquire first movement information (or a first sensing value) from a sensor disposed in a first region (e.g., 240 in FIG. 2) of the wearable electronic device 301 and third movement information (or a third sensing value) from a third sensor included in the external electronic device 302, based on the movement of the wearable electronic device 301 corresponding to the movement of the user 306 wearing the wearable electronic device 301. According to an embodiment, the wearable electronic device 301 may display a virtual object having been displayed at the first location at a third location different from the first location, based on the first movement information (or first sensing value) and the third movement information (or third sensing value). Alternatively, the wearable electronic device 301 may additionally acquire second movement information (or a second sensing value) from a sensor disposed in the second region (e.g., 241 or 242 in FIG. 2) of the wearable electronic device 301. Here, the wearable electronic device 301 may display a virtual object at the third location, based on at least one of the first movement information (or first sensing value), the second movement information (or second sensing value), or the third movement information (or third sensing value). For example, the third location may indicate a location different from the first location, at which a virtual object may be displayed among the entire region (e.g., a visible region) which the user may see through the glass member 350-1 or 350-2.

Referring to FIGS. 3B-1 and 3B-2, the wearable electronic device 301 according to an embodiment may sense the movement of the wearable electronic device 301 according to the movement of the user 305 or 306 wearing the wearable electronic device 301 and change a display location of the virtual object having been displayed. Accordingly, in a case that the wearable electronic device 301 is not closely fixed to the body of the user, even if the wearable electronic device 301 moves up and down and left and right in response to the movement of the user 305 or 306, the user may feel relatively little shaking of the virtual object.

Figure 3C:
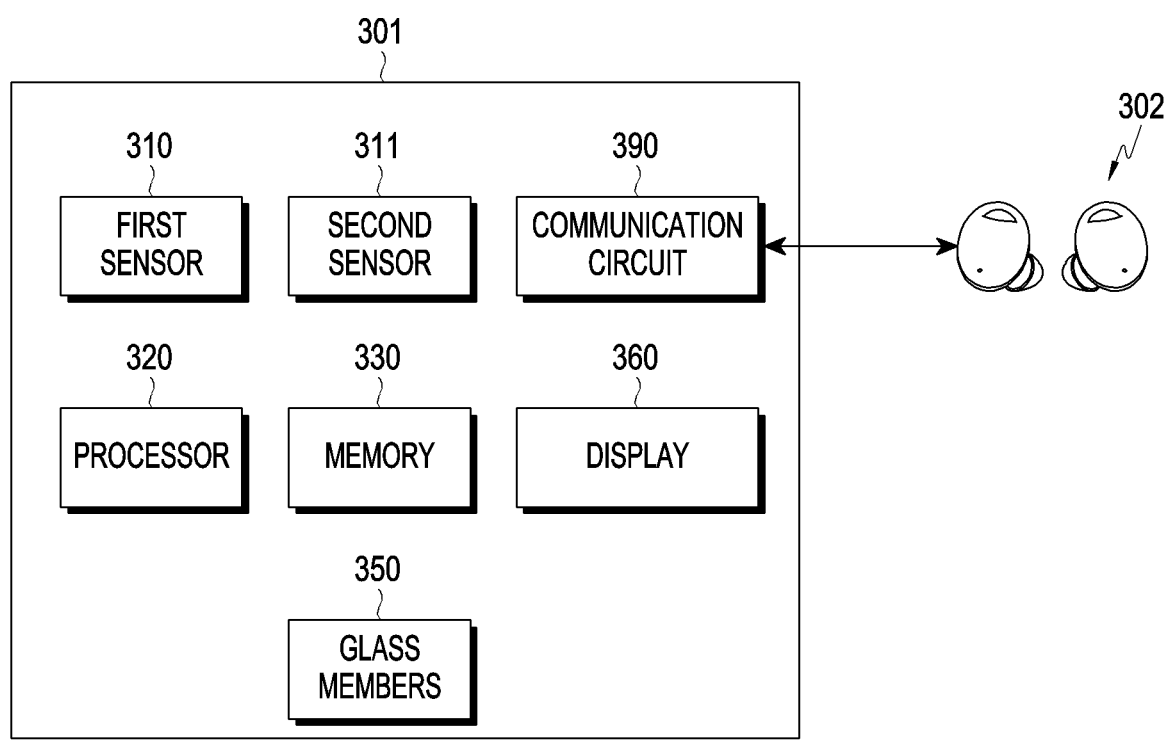
FIG. 3C is a schematic block view illustrating a configuration of an example wearable electronic device according to various embodiments.

FIG. 3C is a schematic block view illustrating a configuration of an example wearable electronic device according to various embodiments.

According to an embodiment, the wearable electronic device 301 (e.g., the electronic device 101 in FIG. 1, or the glasses-type wearable device 201 in FIG. 2) may include at least one processor 320, memory 330, a first sensor 310, a second sensor 311, a glass member(s) 350, a display 360, and a communication circuit 390.

According to an embodiment, the processor 320 (including, e.g., processing circuitry) may control general operations of the electronic device 301. By way of example, the processor 320 may be implemented identically or similarly to the processor 120 in FIG. 1.

According to an embodiment, the display 360 may be implemented identically or similarly to the display module 160 in FIG. 1. According to an embodiment, the display 360 may be implemented identically or similarly to the first display 251 and the second display 252 in FIG. 2. According to an embodiment, the display 360 may indicate the display 360-1 or 360-2 in FIG. 3B-1 and FIG. 3B-2. According to an embodiment, the display 360 may display, for example, a content or an object according to control of the processor 320. For example, in a case that the wearable electronic device 301 is implemented as smart glasses, the display 360 may be implemented as a light output device configured to display a content or an object through the glass member 350.

According to an embodiment, the display 350 may be implemented identically or similarly to the at least one screen display portion 254-1 or 254-2 in FIG. 2. According to an embodiment, the glass member 350 may indicate the glass member 350-1 or 350-2 in FIGS. 3B-1 and 3B-2.

According to an embodiment, the first sensor 310 (e.g., the sensor module 176 in FIG. 1) and the second sensor 311 (e.g., the sensor module 176 in FIG. 1) may acquire movement information or a sensing value which indicates the movement state of the user. According to an embodiment, the first sensor 310 and the second sensor 311 may include at least one of an inertial sensor, a motion sensor, an infrared ray (IR) sensor, a temperature (body temperature) sensor, a gyro sensor, an acceleration sensor, a gravity sensor (or geomagnetic sensor), a proximity sensor, an illumination sensor, a time of flight (TOF) sensor, or a barometer sensor. However, without limitation thereto, the first sensor 310 and the second sensor 311 may include various types of sensors which may identify the movement state of the user. According to an embodiment, the first sensor 310 and the second sensor 311 may include at least one of an X-axis sensor, a Y-axis sensor, or a Z-axis sensor.

According to an embodiment, the first sensor module 310 may be disposed in a first region of the wearable electronic device 301. According to an embodiment, the second sensor module 311 may be disposed in a second region of the wearable electronic device 301. According to an embodiment, the first region and the second region may include different regions.

According to an embodiment, the first region of the wearable electronic device 301 may include a partial region of a main frame (e.g., 240 in FIG. 2) configured to support the glass member 350. According to an embodiment, the second region of the wearable electronic device 301 may include a partial region of at least one of a first support frame (e.g., 241 in FIG. 2) or a second support frame (e.g., 242 in FIG. 2) each of which is connected to opposite ends of the main frame 240 and wearable on the ear of the user. However, the first region and the second region in which the first sensor 310 and the second sensor 311 are disposed are not limited thereto.

According to an embodiment, the processor 320 may identify whether the user is wearing the wearable electronic device 301. For example, the processor 320 may identify whether the user is wearing the wearable electronic device 301, based on sensing values sensed by the first sensor 310 and the second sensor 311. By way of example, the processor 320 may identify that the user is wearing the wearable electronic device 301 in a case that movement indicated by the sensing values satisfies a designated value (e.g., a value indicating wearing). Alternatively, the processor 320 may identify that the user is wearing the wearable electronic device 301, through an additional sensor (now shown) (e.g., a pressure sensor) in addition to the first sensor 310 and/or the second sensor 311.

According to an embodiment, the processor 320 may, when it is identified that the user is wearing the wearable electronic device 301, control the display 360 (e.g., 160 in FIG. 1 or 251 or 252 in FIG. 2) to display guide information for determining a reference value with respect to effective movement of the wearable electronic device 301 through the glass member(s) 350 (e.g., 254-1 or 254-2 in FIG. 2).

For example, the guide information may include information that requests that the user's head be moved in a specified direction (e.g., in at least one of up-and-down, left-and-right, or front-to-rear directions). According to an embodiment, the processor 320 may determine a reference value with respect to effective movement of the wearable electronic device 301, based on the guide information. According to an embodiment, the processor 320 may acquire a sensing value through the first sensor 310 and the second sensor 311 and determine a reference value with respect to effective movement of the wearable electronic device 301, based on the sensing value in a case that the user moves in a designated direction.

According to an embodiment, the processor 320 may control the display 360 to display a virtual object at a first location through the glass member 350 in a state in which the user is wearing the wearable electronic device 301. According to an embodiment, the first location may refer, for example, to a location at which the corresponding virtual object is displayed among the entire region (e.g., a visible region) which the user may see through the glass member 350 in a state in which there is no effective movement of the user.

According to an embodiment, the processor 320 may acquire first movement information of the first region sensed by the first sensor 310 and second movement information of the second region sensed by the second sensor 311, based on the movement of the wearable electronic device 301 corresponding to the movement of the user. According to an embodiment, the first movement information may be determined by a first sensing value acquired through the first sensor 310. According to an embodiment, the second movement information may be determined by a second sensing value acquired through the second sensor 311.

According to an embodiment, the processor 320 may control the display 360 to display a virtual object at a second location different from the first location, based on a difference between the first sensing value and the second sensing value. According to an embodiment, the processor 320 may control the display 360 to display a virtual object at the second location in a case that the difference between the first sensing value and the second sensing value exceeds a preconfigured first value. According to an embodiment, the first value may, for example, refer to a reference value for determining whether the virtual object is displayed as a shaken phase based on movement of the wearable electronic device 301 corresponding to the movement of the user. According to an embodiment, the first value may be configured by the user or configured by the processor 320.

According to an embodiment, the processor 320 may determine the second location with reference to the first location, based on a difference between the first sensing value and the second sensing value. For example, the processor 320 may determine whether to display a virtual object at a location in a direction and by a distance relative to the first location.

According to an embodiment, the processor 320 may determine the second location, based on the degree of the movement or the direction of the movement of the user (or the movement of the wearable electronic device 301).

According to an embodiment, the processor 320 may determine the direction of the movement or the degree of the movement of the user, based on the first sensing value (or the first movement information) and the second sensing value (or the second movement information). According to an embodiment, the processor 320 may configure the second sensing value as a reference value and acquire a difference value between the first sensing value and the second sensing value (e.g., the second sensing value–the first sensing value).

According to an embodiment, the first sensor 310 and the second sensor 311 may include a Z-axis sensor. According to an embodiment, the upward direction of the user's head may be configured to the +Z-axis direction, and the downward direction of the user's head may be configured to the −Z-axis direction. According to an embodiment, the processor 320 may identify that the user's head has moved in the upward direction (e.g., in the +Z-axis direction) in a case that the difference value between the first sensing value acquired using the Z-axis sensor and the second sensing value acquired using the Z-axis sensor (e.g., the second sensing value−the first sensing value) becomes negative. According to an embodiment, the processor 320 may identify that the user's head has moved in the downward direction (e.g., the −Z-axis direction) in a case that the difference value becomes positive. According to an embodiment, the processor 320 may identify a distance value between the first location and the second location, which corresponds to the difference value. According to an embodiment, the processor 320 may display a virtual object at the second location that is located in the downward direction (e.g., the −Z-axis direction) from the first location in case that it is determined that the movement is conducted in the +Z-axis direction. According to an embodiment, the processor 320 may display a virtual object at the second location that is located in the upward direction (e.g., the +Z-axis direction) from the first location in a case that it is determined that the movement is conducted in the −Z-axis direction.

According to an embodiment, the first sensor 310 and the second sensor 311 may include an X-axis sensor. According to an embodiment, the right direction may be configured to the +X-axis direction, and the left direction may be configured to the −X-axis direction. According to an embodiment, the processor 320 may identify that the user's head has moved in the right direction (e.g., in the +X-axis direction) in a case that the difference value between the first sensing value acquired using the X-axis sensor and the second sensing value acquired using the X-axis sensor (e.g., the second sensing value−the first sensing value) becomes negative. According to an embodiment, the processor 320 may, identify that the user's head has moved in the left direction (e.g., in the −X-axis direction) in a case that the difference value becomes positive. According to an embodiment, the processor 320 may display a virtual object at the second location that is located in the left direction (e.g., the −X-axis direction) from the first location in a case that it is determined that the movement is conducted in the +X-axis direction. According to an embodiment, the processor 320 may display a virtual object at the second location that is located in the right direction (e.g., the +X-axis direction) from the first location in a case that it is determined that the movement is conducted in the −X-axis direction.

According to an embodiment, the first sensor 310 and the second sensor 311 may include a Y-axis sensor. According to an embodiment, based on the user's head, the forward direction of the user's head may be configured to the +Y-axis direction, and the backward direction of the user's head may be configured to the −Y-axis direction. According to an embodiment, the processor 320 may identify that the user's head has moved in the forward direction (e.g., in the +Y-axis direction) in a case that the difference value between the first sensing value acquired using the Y-axis sensor and the second sensing value acquired using the Y-axis sensor (e.g., the second sensing value−the first sensing value) becomes negative. According to an embodiment, the processor 320 may identify that the user's head has moved in the backward direction (e.g., the −Y-axis direction) in a case that the difference value becomes positive. According to an embodiment, the processor 320 may display a virtual object at the second location that is located in the backward direction (e.g., the −Y-axis direction) from the first location in a case that it is determined that the movement is conducted in the +Y-axis direction. According to an embodiment, the processor 320 may display a virtual object at the second location that is located in the forward direction (e.g., the +Y-axis direction) from the first location in a case that it is determined that the movement is conducted in the −Y-axis direction.

According to an embodiment, the wearable electronic device 301 may determine a degree of movement, based on the first sensing value and the second sensing value.

According to an embodiment, the processor 320 may configure a distance between the first location and the second location to be increased as the absolute value of the difference value between the first sensing value and the second sensing value (e.g., the second sensing value−the first sensing value) increases. That is, the processor 320 may display the virtual object at the second location that is farther away from the first location as the user's movement (or the movement of the wearable electronic device 301) increases.

According to an embodiment, the processor 320 may determine the second location to display a virtual object, based on the distance value and the direction value identified according to the aforementioned method.

According to an embodiment, the processor 320 may determine the second location, based on a distance from the wearable electronic device 301 to a real-world object corresponding to a virtual object. According to an embodiment, the processor 320 may configure the distance between the first location and the second location to be decreased as the distance from the wearable electronic device 301 to the real-world object increases. That is, the processor 320 may shift the display location of the virtual object relatively less as the real-world object corresponding to the virtual object is farther from the wearable electronic device 301. According to an embodiment, the processor 320 may configure the distance between the first location and the second location to be increased as the distance from the wearable electronic device 301 to the real-world object decreases. That is, the processor 320 may shift the display location of the virtual object relatively greater as the real-world object corresponding to the virtual object is closer to the wearable electronic device 301.

In addition, according to an embodiment, the processor 320 may adjust the size of the virtual object and display the virtual object through the glass member 350, based on the distance from the wearable electronic device 301 to the real-world object corresponding to the virtual object. According to an embodiment, the processor 320 may adjust (or reduce) the size to be relatively smaller as the distance from the wearable electronic device 301 to the real-world object is relatively large.

According to an embodiment, the processor 320 may control the display 360 to display notification information to adjust the wearing state of the wearable electronic device 301 through the glass member 350 in a case that the difference between the first sensing value and the second sensing value exceeds a preconfigured second value larger than a first value with respect to the wearing state of the wearable electronic device 301. Alternatively or additionally, the processor 320 may output the notification information as sound to adjust the wearing state of the wearable electronic device 301. However, without limitation thereto, the embodiments of the disclosure may output the notification information in various manners.

According to an embodiment, the processor 320 may establish communication connection with the external device 302 through the communication circuit 390. For example, the external electronic device 302 may include a wearable electronic device wearable on the ear of the user.

According to an embodiment, the external electronic device 302 may acquire a third sensing value through a third sensor included in the external electronic device, based on movement of the external electronic device 302 corresponding to the movement of the user. In addition, the external electronic device 302 may acquire third movement information indicating movement of a third region (e.g., the region at which the ear of the user is located). For example, the third movement information may be determined by the third sensing value.

According to an embodiment, the wearable electronic device 301 may receive the third sensing value from the external electronic device 302. According to an embodiment, the wearable electronic device 301 may acquire the third movement information of the third region, based on the third sensing value. According to an embodiment, the wearable electronic device 301 may receive the third movement information from the external electronic device 302.

According to an embodiment, the processor 320 may control the display 360 to display the virtual object at the third location different from the first location, based on a difference between the first movement information (or the first sensing value) acquired through the first sensor 310 and the third movement information (or the third sensing value).

According to an embodiment, the processor 320 may configure a distance between the first location and the third location to be increased as the difference value between the first sensing value and the third sensing value (e.g., the third sensing value–the first sensing value) increases.

According to an embodiment, the processor 320 may determine the third location, based on a distance from the wearable electronic device 301 to a real-world object corresponding to a virtual object. According to an embodiment, the processor 320 may configure the distance between the first location and the third location to be reduced as the distance from the wearable electronic device 301 to the real-world object increases. The processor 320 may configure the distance between the first location and the third location to be increased as the real-world object corresponding to the virtual object is closer to the wearable electronic device 301.

According to an embodiment, the processor 320 may control the display 360 to display notification information to adjust the wearing state of the wearable electronic device 301 through the glass member 350 in a case that the difference between the first sensing value and the third sensing value exceeds a preconfigured second value larger than a first value with respect to the wearing state of the wearable electronic device 301. Alternatively or additionally, the processor 320 may output the notification information as sound to adjust the wearing state of the wearable electronic device 301. However, without limitation thereto, the embodiments of the disclosure may output the notification information in various manners.

Operations of the wearable electronic device 301 described below may be performed by the at least one processor 320. However, for convenience of explanation, the operations performed by the at least one processor 320 will be described as being performed by the wearable electronic device 301.

In the following example embodiments, respective operations may be sequentially performed, but are not necessarily sequentially performed. For example, the sequential position of each operation may be changed, and/or at least two operations may be performed in parallel.

Figure 4:
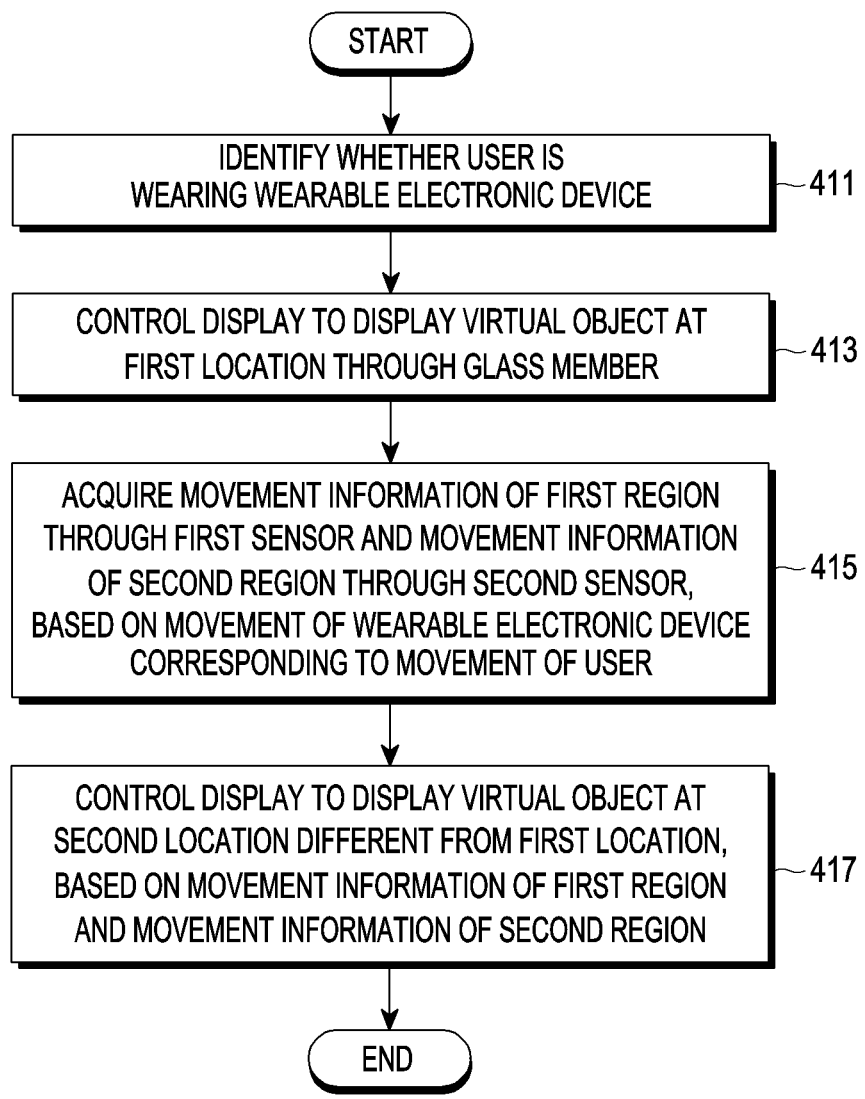
FIG. 4 is a flowchart illustrating an example operation method of an example wearable electronic device according to various embodiments.

FIG. 4 is a flowchart illustrating an example operation method of an example wearable electronic device according to various embodiments.

According to an embodiment, in operation 411, the wearable electronic device 301 (e.g., the wearable electronic device 301 in FIG. 3C) may identify (or detect) whether the user is wearing the wearable electronic device 301.

According to an embodiment, the wearable electronic device 301 may, when it is identified that the user is wearing the wearable electronic device 301, control the display 360 (e.g., the display 360 in FIG. 3C) to display guide information for determining a reference value with respect to effective movement of the wearable electronic device 301 through the glass member(s) 350 (e.g., the glass member 350 in FIG. 3C). For example, the guide information may include information that requests that the user's head be moved in a specified direction (e.g., in at least one of up-and-down, left-and-right, or front-to-rear directions). For example, the designated direction may correspond to a direction for determining a reference value with respect to effective movement. According to an embodiment, the processor 320 may acquire a sensing value through the first sensor 310 and the second sensor 311 and determine a reference value with respect to effective movement of the wearable electronic device 301, based on the sensing value.

According to an embodiment, in operation 413, the wearable electronic device 301 may control the display 360 to display a virtual object at a first location through the glass member 350. According to an embodiment, the first location may indicate a location at which the corresponding virtual object is displayed among the entire region (e.g., a visible region) which the user may see through the glass member 350 in a state in which there is no effective movement of the user.

According to an embodiment, in operation 415, the wearable electronic device 301 may acquire movement information (or a first sensing value) of the first region sensed by the first sensor 310 and movement information (or a second sensing value) of the second region sensed by the second sensor 311, based on the movement of the wearable electronic device 301 corresponding to the movement of the user. According to an embodiment, the first sensor 310 may be disposed in a first region of the wearable electronic device 301. According to an embodiment, the second sensor 311 may be disposed in a second region of the wearable electronic device 301. According to an embodiment, the first region of the wearable electronic device 301 may include a partial region of a main frame (e.g., 240 in FIG. 2) configured to support the glass member 350. According to an embodiment, the second region of the wearable electronic device 301 may include a partial region of at least one of a first support frame (e.g., 241 in FIG. 2) or a second support frame (e.g., 242 in FIG. 2) each of which is connected to opposite ends of the main frame and wearable on the ear of the user. However, the first region and the second region in which the first sensor 310 and the second sensor 311 are disposed are not limited thereto.

According to an embodiment, the movement information of the first region may indicate a sensing value acquired through the first sensor 310. The movement information of the second region may indicate a sensing value acquired through the second sensor 311.

According to an embodiment, in operation 417, the wearable electronic device 301 may control the display 360 to display a virtual object at a second location different from the first location, based on the movement information of the first region (e.g., 240 in FIG. 2) and the movement information of the second region (e.g., 241 or 242 in FIG. 2). According to an embodiment, the wearable electronic device 301 may control the display 360 to display a virtual object at a second location different from the first location, based on a difference between the first sensing value and the second sensing value. According to an embodiment, the wearable electronic device 301 may control the display 360 to display a virtual object at the second location in a case that the difference between the first sensing value and the second sensing value exceeds a preconfigured first value. According to an embodiment, the first value may indicate a reference value indicating that the virtual object is displayed as a shaken phase based on movement of the wearable electronic device 301 corresponding to the movement of the user. According to an embodiment, the wearable electronic device 301 may configure the distance between the first location and the second location to be relatively increased as the difference between the first sensing value and the second sensing value increases.

Figure 5:
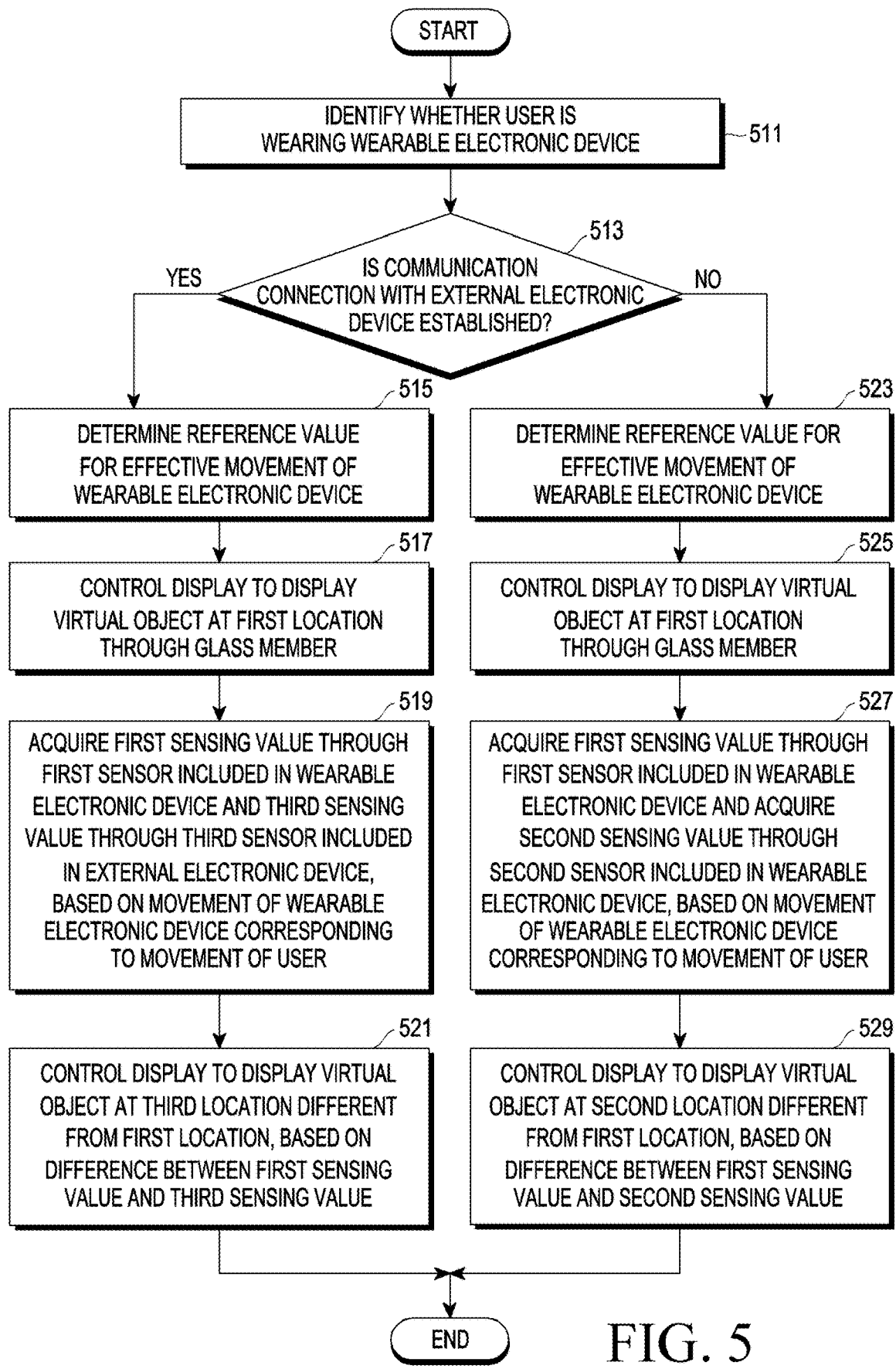
FIG. 5 is a flowchart illustrating an example operation method of an example wearable electronic device according to various embodiments.

FIG. 5 is a flowchart illustrating an example operation method of an example wearable electronic device according to various embodiments.

According to an embodiment, in operation 511, the wearable electronic device 301 (e.g., the wearable electronic device 301 in FIG. 3C) may identify whether the user is wearing the wearable electronic device 301.

According to an embodiment, in operation 513, the wearable electronic device 301 may identify whether a communication connection with the external electronic device 302 is established through the communication circuit 390 (e.g., the communication circuit 390 in FIG. 3C). According to an embodiment, the external electronic device may include a wearable electronic device wearable on the ear of the user.

According to an embodiment, the wearable electronic device 301 may determine a reference value with respect to effective movement of the wearable electronic device 301 in operation 515 in a case that it is identified communication connection with the external electronic device 302 is established (operation 513—YES). According to an embodiment, the wearable electronic device 301 may control the display 360 (e.g., 160 in FIG. 1, 251 or 252 in FIG. 2, 360-1 or 360-2 in FIG. 3B-1 and FIG. 3B-2, or 360 in FIG. 3C) to display guide information for determining a reference value with respect to effective movement of the wearable electronic device 301 through the glass member 350 (e.g., 254-1 or 254-2 in FIG. 2, 350-1 or 350-2 in FIG. 3B-1 and FIG. 3B-2, or 350 in FIG. 3C). According to an embodiment, the wearable electronic device 301 may determine a reference value with respect to effective movement, based on sensing values acquired through the first sensor 310 included in the wearable electronic device 301 and the third sensor included in the external electronic device 302.

According to an embodiment, in operation 517, the wearable electronic device 301 may control the display 360 to display a virtual object at a first location through the glass member 350. According to an embodiment, the first location may, for example, refer to a location at which the corresponding virtual object is displayed among the entire region (e.g., a visible region) which the user may see through the glass member(s) 350 in a state in which there is no effective movement of the user.

According to an embodiment, in operation 519, the wearable electronic device 301 may acquire a first sensing value (or first movement information) from the first sensor 310 included in the wearable electronic device 301 and a third sensing value (or third movement information) from a third sensor included in the external electronic device 302, based on the movement of the wearable electronic device 301 corresponding to the movement of the user. According to an embodiment, the third sensor may include a sensor capable of acquiring a sensing value indicating a movement state of the user.

According to an embodiment, in operation 521, the wearable electronic device 301 may control the display 360 to display a virtual object at a third location different from the first location, based on a difference between the first sensing value and the third sensing value. According to an embodiment, the wearable electronic device 301 may configure the distance between the first location and the third location to be relatively increased as the difference between the first sensing value and the third sensing value increases.

According to an embodiment the wearable electronic device 301 may determine a reference value with respect to effective movement of the wearable electronic device 301 in operation 523 when it is identified that a communication connection with the external electronic device 302 is not established (operation 513-NO). According to an embodiment, the wearable electronic device 301 may control the display 360 (e.g., 160 in FIG. 1, 251 or 252 in FIG. 2, 360-1 or 360-2 in FIG. 3C, or 360 in FIG. 3C) to display guide information for determining a reference value with respect to effective movement of the wearable electronic device 301 through the glass member (e.g., 254-1 or 254-2 in FIG. 2, 350-1 or 350-2 in FIG. 3B-1 and FIG. 3B-2, or 350 in FIG. 3C). According to an embodiment, the wearable electronic device 301 may determine a reference value with respect to effective movement, based on sensing values acquired through the first sensor 310 included in the wearable electronic device 301 and the second sensor 311.

According to an embodiment, in operation 525, the wearable electronic device 301 may control the display to display a virtual object at a first location through the glass member 350. According to an embodiment, the first location may refer, for example, to a location at which a virtual object is displayed in a state in which there is no effective movement of the user.

According to an embodiment, in operation 527, the wearable electronic device 301 may acquire a first sensing value (or first movement information) from the first sensor 310 included in the wearable electronic device 301 and a second sensing value (or second movement information) from the second sensor 311 included in the wearable electronic device 301, based on the movement of the wearable electronic device 301 corresponding to the movement of the user.

According to an embodiment, in operation 529, the wearable electronic device 301 may control the display 360 to display a virtual object at a second location different from the first location, based on a difference between the first sensing value and the second sensing value. According to an embodiment, the wearable electronic device 301 may configure the distance between the first location and the second location to be relatively increased as the difference between the first sensing value and the second sensing value increases.

Hereinafter, for convenience of explanation, it is assumed that a communication connection between the wearable electronic device 301 and the external electronic device is not established. According to an embodiment, even if a communication connection between the wearable electronic device 301 and the external electronic device 302 is established, the wearable electronic device 301 may perform operations described below.

Figure 6A:
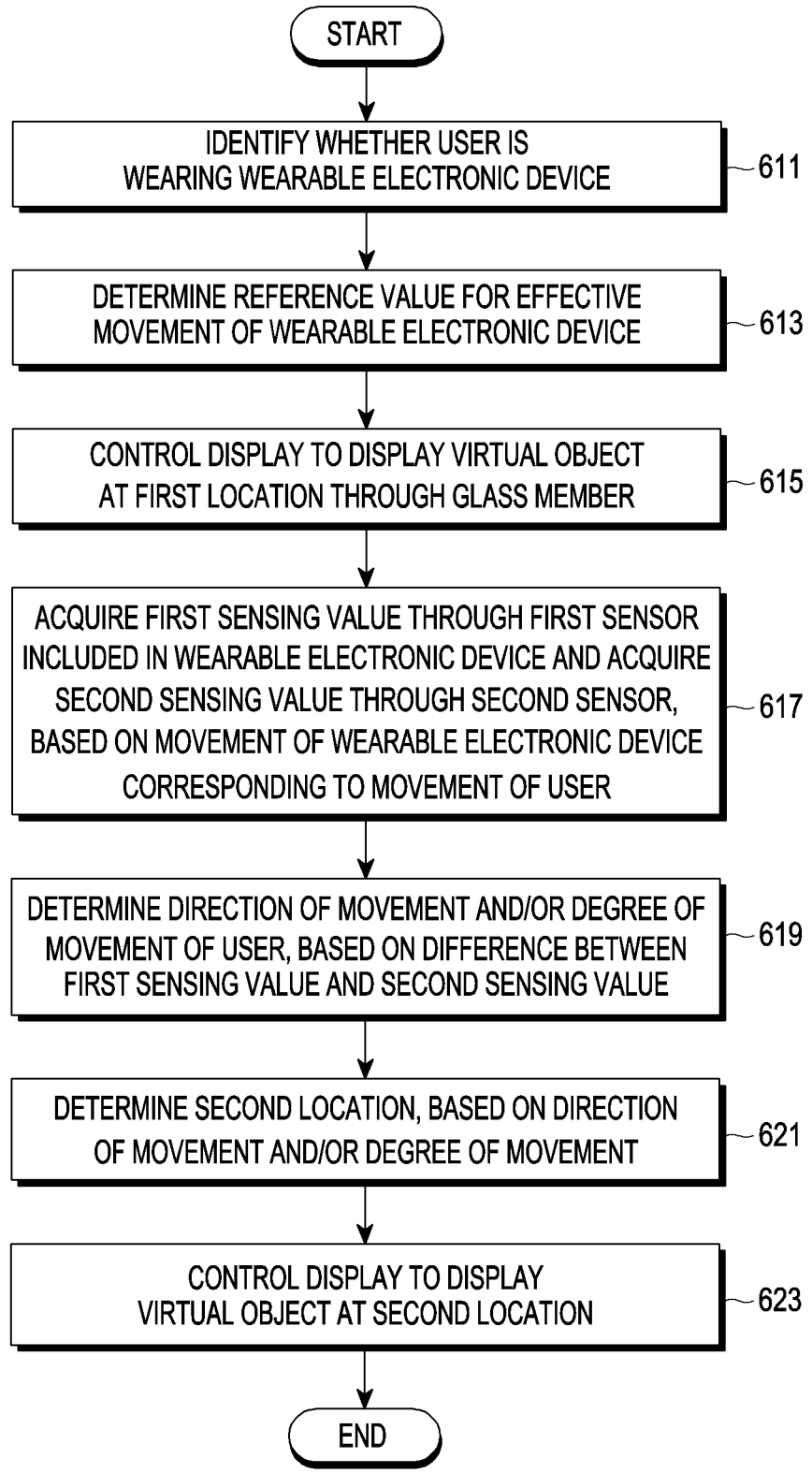
FIG. 6A is a flowchart illustrating an example operation method of an example wearable electronic device according to various embodiments.

FIG. 6A is a flowchart illustrating an example operation method of an example wearable electronic device according to various embodiments.

According to an embodiment, in operation 611, the wearable electronic device 301 (e.g., the wearable electronic device 301 in FIG. 3C) may identify (or detect) whether the user is wearing the wearable electronic device 301.

According to an embodiment, in operation 613, the wearable electronic device 301 may determine a reference value with respect to effective movement of the wearable electronic device 301. According to an embodiment, the wearable electronic device 301 may determine a reference value with respect to effective movement, based on sensing values acquired through the first sensor 310 included in the wearable electronic device 301 and the second sensor 311.

According to an embodiment, in operation 615, the wearable electronic device 301 may control the display to display a virtual object at a first location through the glass member 350.

According to an embodiment, in operation 617, the wearable electronic device 301 may acquire a first sensing value (or first movement information) through the first sensor and a second sensing value (or second movement information) sensed by the second sensor, based on the movement of the wearable electronic device 301 corresponding to the movement of the user.

According to an embodiment, in operation 619, the wearable electronic device 301 may determine a direction of the movement and/or a degree of the movement of the user, based on the first sensing value and the second sensing value. According to an embodiment, the processor 320 may configure the second sensing value as a reference value and acquire a difference value between the first sensing value and the second sensing value (e.g., the second sensing value–the first sensing value). According to an embodiment, the second sensor 311 may be disposed in a partial region of at least one of a first support frame (e.g., 241 in FIG. 2) or a second support frame (e.g., 242 in FIG. 2) wearable on the ear of the user and thus acquire a sensing value with respect to movement corresponding to the movement of the head of the user. According to an embodiment, the first sensor 310 may be disposed in a partial region of the main frame 240 configured to support the glass member(s) 350 and thus acquire a sensing value with respect to movement different from the movement of the head of the user.

According to an embodiment, the first sensor 310 and the second sensor 311 may include a Z-axis sensor. According to an embodiment, the upward direction of the user's head may be configured to the +Z direction, and the downward direction of the user's head may be configured to the −Z direction. According to an embodiment, the processor 320 may identify that the user's head has moved in the upward direction in a case that the difference value between the first sensing value acquired using the Z-axis sensor and the second sensing value acquired using the Z-axis sensor (e.g., the second sensing value–the first sensing value) becomes negative. According to an embodiment, the processor 320 may identify that the user's head has moved in the downward direction in a case that the difference value becomes positive.

According to an embodiment, the first sensor 310 and the second sensor 311 may include an X-axis sensor. According to an embodiment, the right direction may be configured to the +X direction, and the left direction may be configured to the −X direction. According to an embodiment, the processor 320 may identify that the user's head has moved in the right direction in a case that the difference value between the first sensing value acquired using the X-axis sensor and the second sensing value acquired using the X-axis sensor (e.g., the second sensing value–the first sensing value) becomes negative. According to an embodiment, the processor 320 may identify that the user's head has moved in the left direction in a case that the difference value becomes positive.

According to an embodiment, the first sensor 310 and the second sensor 311 may include a Y-axis sensor. According to an embodiment, based on the user's head, the forward direction of the user's head may be configured to the +Y-axis direction, and the backward direction of the user's head may be configured to the −Y-axis direction. According to an embodiment, the processor 320 may identify that the user's head has moved in the forward direction in a case that the difference value between the first sensing value acquired using the Y-axis sensor and the second sensing value acquired using the Y-axis sensor (e.g., the second sensing value–the first sensing value) becomes negative. According to an embodiment, the processor 320 may identify that the user's head has moved in the backward direction in a case that the difference value becomes positive.

According to an embodiment, the wearable electronic device 301 may determine a degree of movement, based on the difference value (or the absolute value of the difference value) between the first sensing value and the second sensing value. According to an embodiment, the wearable electronic device 301 may determine that the greater the absolute value of the difference between the first sensing value and the second sensing value, the relatively greater the degree of the movement of the user.

According to an embodiment, in operation 621, the wearable electronic device 301 may determine the second location, based on the degree of the movement and/or the direction of the movement. According to an embodiment, the second location may include a location different from the first location.

According to an embodiment, the wearable electronic device 301 may display a virtual object at the second location that is located in the downward direction (e.g., the −Z-axis direction) from the first location in a case that it is determined that the movement is conducted in the +Z-axis direction. According to an embodiment, the wearable electronic device 301 may display a virtual object at the second location that is located in the upward direction (e.g., the +Z-axis direction) from the first location in a case that it is determined that the movement is conducted in the −Z-axis direction.

According to an embodiment, the wearable electronic device 301 may display a virtual object at the second location that is located in the left direction (e.g., the −X-axis direction) from the first location in a case that it is determined that the movement is conducted in the +X-axis direction. According to an embodiment, the wearable electronic device 301 may display a virtual object at the second location that is located in the right direction (e.g., the +X-axis direction) from the first location in a case that it is determined that the movement is conducted in the −X-axis direction.

According to an embodiment, the wearable electronic device 301 may display a virtual object at the second location that is located in the backward direction (e.g., the −Y-axis direction) from the first location in a case that it is determined that the movement is conducted in the +Y-axis direction. According to an embodiment, the wearable electronic device 301 may display a virtual object at the second location that is located in the forward direction (e.g., the +Y-axis direction) from the first location in a case that it is determined that the movement is conducted in the −Y-axis direction.

According to an embodiment, the wearable electronic device 301 may configure the distance between the first location and the second location to be increased as the absolute value of the difference between the first sensing value and the second sensing value increases. According to an embodiment, the wearable electronic device 301 may identify a distance value between the first location and the second location, corresponding to the difference between the first sensing value and the second sensing value acquired. That is, the wearable electronic device 301 may display the virtual object at the second location that is relatively farther away from the first location as the user's movement (or the movement of the wearable electronic device 301) increases.

According to an embodiment, in operation 623, the wearable electronic device 301 may control the display 360 to display a virtual object at the second location.

Figure 6B:
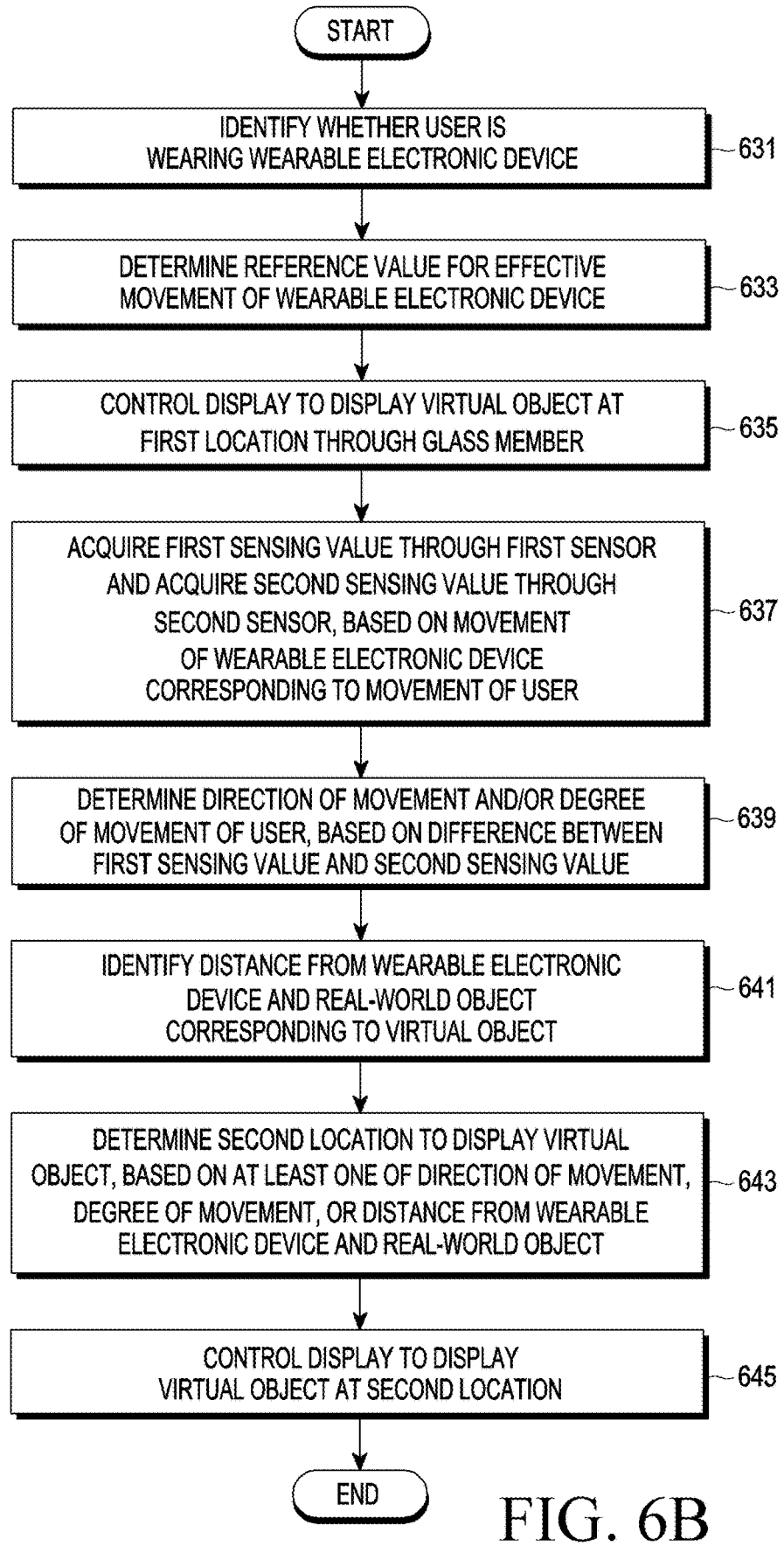
FIG. 6B is a flowchart illustrating an example operation method of an example wearable electronic device according to various embodiments.

FIG. 6B is a flowchart illustrating an example operation method of an example wearable electronic device according to various embodiments.

According to an embodiment, in operation 631, the wearable electronic device 301 (e.g., the wearable electronic device 301 in FIG. 3C) may identify (or detect) whether the user is wearing the wearable electronic device 301.

According to an embodiment, in operation 633, the wearable electronic device 301 may determine a reference value with respect to effective movement of the wearable electronic device 301.

According to an embodiment, in operation 635, the wearable electronic device 301 may control the display to display a virtual object at a first location through the glass member(s) 350.

According to an embodiment, in operation 637, the wearable electronic device 301 may acquire a first sensing value (or first movement information) through the first sensor 310 and a second sensing value (or second movement information) through the second sensor 311, based on the movement of the wearable electronic device 301 corresponding to the movement of the user.

According to an embodiment, in operation 639, the wearable electronic device 301 may determine a direction of the movement and/or a degree of the movement of the user, based on the first sensing value and the second sensing value.

According to an embodiment, in operation 641, the wearable electronic device 301 may identify a distance from the wearable electronic device 301 to a real-world object corresponding to the virtual object. According to an embodiment, the wearable electronic device 301 may apply a smaller weighting for the degree of movement as the distance between the wearable electronic device 301 and the real-world object is increased. That is, the wearable electronic device 301 may change the display location of the virtual object relative to the first location by a smaller amount as the real-world object corresponding to the virtual object is farther away. The wearable electronic device 301 may apply a greater weighting for the degree of movement as the distance between the wearable electronic device 301 and the real-world object is reduced. That is, the wearable electronic device 301 may change the display location of the virtual object relative to the first location by a greater amount as the real-world object corresponding to the virtual object is closer.

According to an embodiment, in operation 643, the wearable electronic device 301 may determine the second location to display the virtual object, based on at least one of the direction of the movement, the degree of the movement, or the distance between the wearable electronic device 301 and the real-world object.

According to an embodiment, in operation 645, the wearable electronic device 301 may control the display 360 to display a virtual object at the second location. According to an embodiment, the second location may include a location different from the first location.

According to an embodiment, the wearable electronic device 301 may display the virtual object through the glass member(s) 350 with a relatively small locational correction for movement of the wearable electronic device 301 in a case of a virtual object corresponding to a real-world object that is relatively far away. According to an embodiment, the wearable electronic device 301 may display the virtual object through the glass member(s) 350 with a relatively great locational correction for movement of the wearable electronic device 301 in a case of a virtual object corresponding to a real-world object that is relatively close. According to an embodiment, the wearable electronic device 301 may provide the user with a perspective view of the screen on which the virtual object is displayed.

Figure 7A:
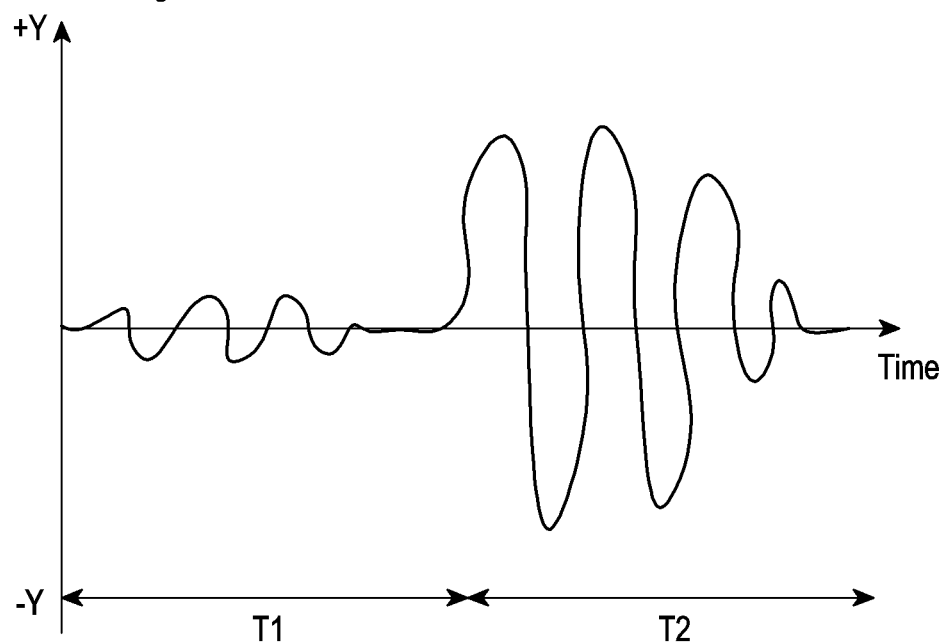
FIG. 7A is a graph depicting a difference in sensing values according to movement of a wearable electronic device according to various embodiments.

FIG. 7A is a graph depicting a difference in sensing values according to movement of an example wearable electronic device according to various embodiments.

According to an embodiment, the y-axis of the graph may represent a difference in sensing values. According to an embodiment, FIG. 7A is a graph depicting data regarding differences in sensing values acquired using one of an X-axis sensor, a Y-axis sensor, or a Z-axis sensor.

According to an embodiment, data plotted in the +y direction of the graph may indicate that the difference in sensing values is positive, while data plotted in the −y direction of the graph may indicate that the difference in sensing values is negative.

According to an embodiment, the difference in sensing values may indicate a difference value between the second sensing value and the first sensing value configured based on the second sensing value (e.g., the second sensing value−the first sensing value) of the wearable electronic device 301. According to an embodiment, the difference in sensing values may indicate a difference value between the third sensing value and the first sensing value configured based on the third sensing value acquired through the third sensor included in the external electronic device 302 (e.g., the third sensing value−the first sensing value).

According to an embodiment, a first time T1 may refer, for example, to a time interval during which there is no effective movement of the wearable electronic device 301. According to an embodiment, a second time T2 may refer, for example, to a time interval during which there is effective movement of the wearable electronic device 301.

According to an embodiment, the wearable electronic device 301 may determine the direction of the movement of the wearable electronic device 301, based on the sign of the difference value. In addition, the wearable electronic device 301 may determine the degree of the movement of the wearable electronic device 301, based on the absolute value of the difference value. For example, the wearable electronic device 301 may acquire a larger difference value in sensing values at the second time T2 than at the first time T1. For example, the wearable electronic device 301 may change the display location of the virtual object relatively more at the second time T2 than at the first time T1.

Figure 7B:
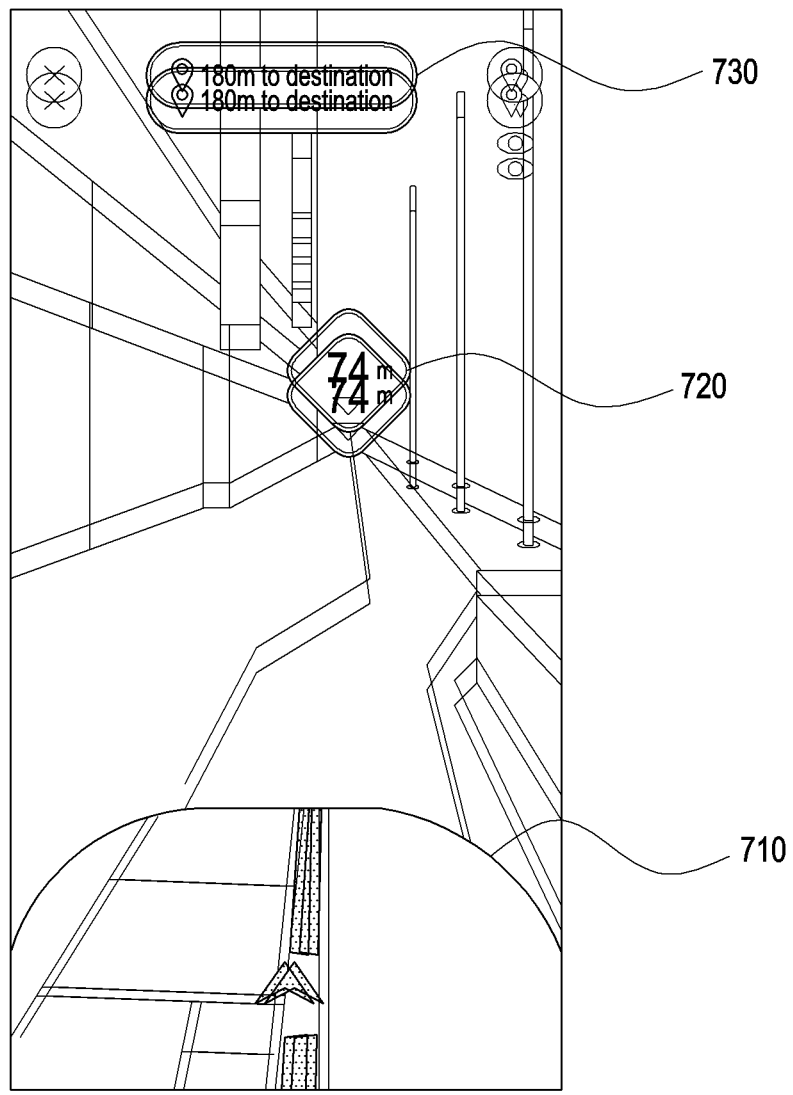
FIG. 7B is a view illustrating a conventional wearable electronic device displaying a shaken image of a virtual object through a glass member according to a comparative example.

FIG. 7B is a view illustrating a conventional wearable electronic device displaying a shaken image of a virtual object through a glass member according to a comparative example.

A wearable electronic device 303 (e.g., the wearable electronic device 303 in FIG. 3A) may move according to the movement of the user wearing the wearable electronic device 303.

According to a comparative example, an image 710, 720, or 730 of a virtual object may be displayed through the glass member in a shaken state according to the movement of the wearable electronic device (e.g., the wearable electronic device 303 in FIG. 3A).

Accordingly, there is a problem with a conventional wearable electronic device 303 that the virtual object displayed through the glass member is displayed in a shaken state according to the movement of the wearable electronic device 303. In addition, there is a problem that the conventional wearable electronic device 303 according to the comparative example displays the image of the virtual object in a shaken state through the glass member, and thus fails to provide users with a perspective screen.

Figure 7C:
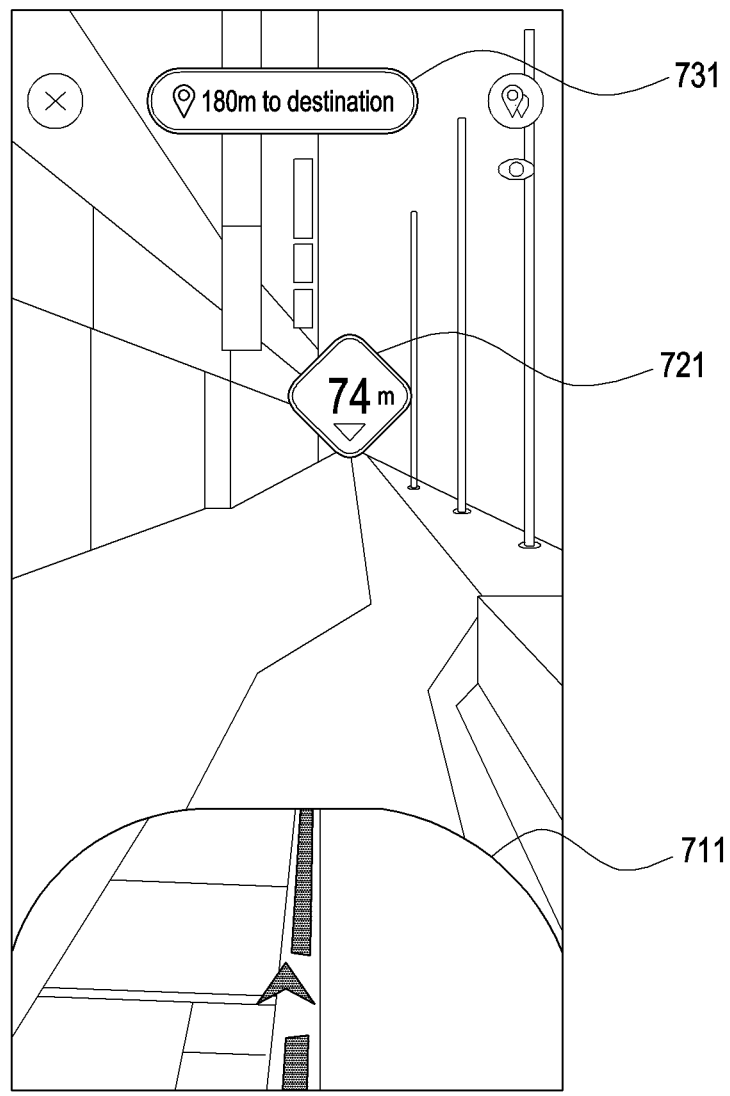
FIG. 7C is a view illustrating an example wearable electronic device displaying a virtual object through a glass member by changing a location at which the virtual object is displayed according to various embodiments.

FIG. 7C is a view illustrating an example wearable electronic device displaying a virtual object through a glass member by changing a location at which the virtual object is displayed according to various embodiments.

According to an embodiment, the wearable electronic device 301 may control the display (e.g., the display 360 in FIG. 3C) to display a virtual object at a first location through the glass member 350 in a state in which the user is wearing the wearable electronic device 301. According to an embodiment, the first location may indicate a location at which a virtual object is displayed in a state in which there is no effective movement of the user.

According to an embodiment, the wearable electronic device 301 may identify the movement of the wearable electronic device 301 corresponding to the movement of the user.

According to an embodiment, the wearable electronic device 301 may control the virtual object 711, 721, or 731 to be displayed at the second location different from the first location through the glass member(s) 350, based on the difference between the first sensing value acquired through the first sensor (e.g., the first sensor 310 in FIG. 3C) and the second sensing value acquired through the second sensor (e.g., the second sensor 311 in FIG. 3C), or the difference between the first sensing value acquired through the first sensor 310 and the third sensing value acquired from the external electronic device (e.g., the external electronic device 302 in FIG. 3C).

According to an embodiment, the wearable electronic device 301 may provide the user with the virtual object having an unshaken image.

In addition, according to an embodiment, the wearable electronic device 301 may determine the second location, based on a distance from the wearable electronic device 301 to a real-world object corresponding to the virtual object.

According to an embodiment, the wearable electronic device 301 may change the display location of the virtual object relative to the first location by a smaller amount as the distance between the wearable electronic device 301 and the real-world object increases. According to an embodiment, the wearable electronic device 301 may change the display location of the virtual object relative to the first location by a greater amount as the real-world object corresponding to the virtual object is closer.

For example, the wearable electronic device 301 may determine that a first real-world object corresponding to a first virtual object 721 is farthest from the wearable electronic device 301. The wearable electronic device 301 may determine that a third real-world object corresponding to a third virtual object 711 is closest to the wearable electronic device 301.

According to an embodiment, the wearable electronic device 301 may configure a change value of the location of the first virtual object 721 to be relatively smallest. According to an embodiment, the wearable electronic device 301 may configure a change value of the location of the third virtual object 711 to be relatively greatest. According to an embodiment, the wearable electronic device 301 may configure a location change value of the second virtual object 731 to be greater than a location change value of the first virtual object 721 and less than a location change value of the third virtual object 711. According to an embodiment, the location change value may indicate a distance value between the first location and the second location.

According to an embodiment, the wearable electronic device 301 may provide the user with a perspective screen.

According to an example embodiment, a wearable electronic device may include a glass member, a display configured to display a virtual object through the glass member, a first sensor disposed in a first region of the wearable electronic device, a second sensor disposed in a second region of the wearable electronic device, a memory, and at least one processor. The memory may store at least one instruction which, when executed by the at least one processor, causes the wearable electronic device to control the display to display a virtual object at a first location through the glass member in a state in which the wearable electronic device is worn by a user; acquire movement information of a first region through the first sensor and acquire movement information of the second region through the second sensor, based on movement of the wearable electronic device corresponding to movement of the user; and control the display to display the virtual object at a second location different from the first location, based on the movement information of the first region and the movement information of the second region.

According to an example embodiment, the memory may store at least one instruction which, when executed by the at least one processor, causes the wearable electronic device to, in a case that the difference between the first sensing value representing the movement information of the first region and the second sensing value representing the movement information of the second region exceeds a preconfigured first value, control the display to display the virtual object at the second location.

According to an example embodiment, the memory may store at least one instruction which, when executed by the at least one processor, causes the wearable electronic device to, in a case that a difference between the first sensing value and the second sensing value exceeds a preconfigured second value that is greater than a first value for the wearing state of the wearable electronic device, control the display to display notification information to adjust the wearing state of the wearable electronic device through the glass member.

According to an example embodiment, the memory may store at least one instruction which, when executed by the at least one processor, causes the wearable electronic device to determine a direction of the movement of the user, based on the difference between the first sensing value representing the movement information of the first region and the second sensing value representing the movement information of the second region.

According to an example embodiment, the memory may store at least one instruction which, when executed by the at least one processor, causes the wearable electronic device to determine the second location, based on the direction of the movement.

According to an example embodiment, the memory may store at least one instruction which, when executed by the at least one processor, causes the wearable electronic device to control the display to display guide information for determining a reference value with respect to effective movement of the wearable electronic device through the glass member in a state in which the wearable electronic device is worn by the user.

According to an example embodiment, the memory may store at least one instruction which, when executed by the at least one processor, causes the wearable electronic device to acquire movement information of the first region and movement information of the second region, based on the reference value.

According to an example embodiment, the memory may store at least one instruction which, when executed by the at least one processor, causes the wearable electronic device to determine the second location, based on a distance from the wearable electronic device to a real-world object corresponding to the virtual object.

According to an example embodiment, the memory may store at least one instruction which, when executed by the at least one processor, causes the wearable electronic device to configure a distance between the first location and the second location to be smaller as the distance from the wearable electronic device to the real-world object increases.

According to an example embodiment, an operation method of a wearable electronic device may include controlling a display included in the wearable electronic device to display a virtual object at a first location through a glass member included in the wearable electronic device in a state in which the wearable electronic device is worn by a user; acquiring movement information of a first region through a first sensor disposed in the first region of the wearable electronic device and acquiring movement information of a second region through a second sensor disposed in the second region of the wearable electronic device, based on movement of the wearable electronic device corresponding to movement of the user; and controlling the display to display the virtual object at a second location different from the first location, based on the movement information of the first region and the movement information of the second region.

According to an example embodiment, the operation method of the wearable electronic device may include, in a case that a difference between a first sensing value representing the movement information of the first region and a second sensing value representing the movement information of the second region exceeds a preconfigured first value, controlling the display to display the virtual object at the second location.

According to an example embodiment, the operation method of the wearable electronic device may include, in a case that a difference between the first sensing value and the second sensing value exceeds a preconfigured second value that is greater than a first value for the wearing state of the wearable electronic device, controlling the display to display notification information to adjust the wearing state of the wearable electronic device through the glass member.

According to an example embodiment, the operation method of the wearable electronic device may include determining a direction of the movement of the user, based on the difference between the first sensing value representing the movement information of the first region and the second sensing value representing the movement information of the second region.

According to an example embodiment, the operation method of the wearable electronic device may include determining the second location, based on the direction of the movement.

According to an example embodiment, an operation method of the wearable electronic device may include controlling the display to display guide information for determining a reference value with respect to effective movement of the wearable electronic device through the glass member in a state in which the wearable electronic device is worn by the user.

According to an example embodiment, the operation method of the wearable electronic device may include determining the second location, based on a distance from the wearable electronic device to a real-world object corresponding to the virtual object.

According to an example embodiment, the operation method of the wearable electronic device may include configuring a distance between the first location and the second location to be smaller as the distance from the wearable electronic device to the real-world object increases.

According to an example embodiment, a first wearable electronic device may include a glass member, a display configured to display a virtual object through the glass member, a first sensor, a communication circuit, a memory, and at least one processor. The memory may store at least one instruction which, when executed by the at least one processor, causes the first wearable electronic device to control the display to display a virtual object at a first location through the glass member in a state in which the first wearable electronic device is worn by a user; acquire first movement information through a first sensor, based on movement of the first wearable electronic device corresponding to the movement of the user and acquire second movement information from a second wearable electronic device worn by the user through the communication circuit, the second movement information including a value acquired through a second sensor included in the second wearable electronic device, based on movement of the second wearable electronic device corresponding to the movement of the user; and control the display to display the virtual object at a second location different from the first location, based on the movement information of the first region and the movement information of the second region.

According to an example embodiment, the memory may store at least one instruction which, when executed by the at least one processor, causes the first wearable electronic device to, in a case that the difference between the first sensing value representing the first movement information and the second sensing value representing the second movement information exceeds a preconfigured first value, control the display to display the virtual object at the second location.

According to an example embodiment, the memory may store at least one instruction which, when executed by the at least one processor, causes the first wearable electronic device to, in a case that a difference between the first sensing value and the second sensing value exceeds a preconfigured second value that is greater than a first value for the wearing state of the wearable electronic device, control the display to display notification information to adjust the wearing state of the wearable electronic device through the glass member.

According to an example embodiment, the memory may store at least one instruction which, when executed by the at least one processor, causes the first wearable electronic device to determine a direction of the movement of the user, based on a difference between the first sensing value representing the first movement information and the second sensing value representing the second movement information.

According to an example embodiment, the memory may store at least one instruction which, when executed by the at least one processor, causes the first wearable electronic device to determine the second location, based on the direction of the movement.

According to an example embodiment, the memory may store at least one instruction which, when executed by the at least one processor, causes the first wearable electronic device to determine the second location, based on a distance from the first wearable electronic device to a real-world object corresponding to the virtual object.

According to an example embodiment, the first wearable electronic device may include augmented reality glasses (AR glasses).

In relation to the first wearable electronic device, the second wearable electronic device may include a wearable electronic device wearable on the ear.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," "at least one of A, B, or C,", and "at least one of A, B, and/or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101, 201, 301) For example, a processor (e.g., the processor 120, 320) of the machine (e.g., the electronic device 101, 201, 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The disclosure has been described with reference to the embodiments. It would be appreciated by those skilled in the art that changes may be made to these embodiments without departing from the principles and spirit of the disclosure. Therefore, the disclosed embodiments are provided for the purpose of describing the disclosure and the disclosure should not be construed as being limited to only the embodiments set forth herein. The scope of the disclosure is defined by the claims as opposed to by the above-mentioned descriptions, and it should be understood that disclosure includes all differences made within the equivalent scope. It will also be understood that any of the embodiment(s) described herein may be used in conjunction with any other embodiment(s) described herein.

What is claimed is:

1. A wearable electronic device comprising:
    a glass member;
    a display configured to display a virtual object through the glass member;
    a first sensor disposed in a first region of the wearable electronic device;
    a second sensor disposed in a second region of the wearable electronic device;
    memory; and
    at least one processor comprising processing circuitry,
    wherein the memory stores at least one instruction which, when executed by the at least one processor individually or collectively, causes the wearable electronic device to:
        display, through the display, a virtual object at a first location through the glass member in a state in which the wearable electronic device is worn by a user;
        acquire movement information of the first region through the first sensor and movement information of the second region through the second sensor, based on movement of the wearable electronic device, corresponding to movement of the user; and
        display, through the display, the virtual object at a second location different from the first location, based on the movement information of the first region and the movement information of the second region.

2. The wearable electronic device of claim 1, wherein at least one instruction, when executed by the at least one processor individually or collectively, causes the wearable electronic device to display, through the display, the virtual object at the second location, based on a difference between a first sensing value representing the movement information of the first region and a second sensing value representing the movement information of the second region exceeding a specified first value.

3. The wearable electronic device of claim 1, wherein at least one instruction, when executed by the at least one processor individually or collectively, causes the wearable electronic device to display, through the display, notification information for adjusting a wearing state of the wearable electronic device through the glass member, based on the difference between the first sensing value and the second sensing value exceeding a specified second value greater than the first value for the wearing state of the wearable electronic device.

4. The wearable electronic device of claim 1, wherein at least one instruction, when executed by the at least one processor individually or collectively, causes the wearable electronic device to:
    determine a direction of the movement of the user, based on the difference between the first sensing value representing the movement information of the first region and the second sensing value representing the movement information of the second region; and
    determine the second location, based on the direction of the movement.

5. The wearable electronic device of claim 1, wherein at least one instruction, when executed by the at least one processor individually or collectively, causes the wearable electronic device to:
    display, through the display, guide information for determining a reference value with respect to effective movement of the wearable electronic device through the glass member in the state in which the wearable electronic device is worn by the user; and
    acquire movement information of the first region and movement information of the second region, based on the reference value.

6. The wearable electronic device of claim 1, wherein at least one instruction, when executed by the at least one processor individually or collectively, causes the wearable electronic device to determine the second location, based on a distance from the wearable electronic device to a real-world object corresponding to the virtual object.

7. The wearable electronic device of claim 1, wherein at least one instruction, when executed by the at least one processor individually or collectively, causes the wearable electronic device to configure a distance between the first location and the second location to be smaller as the distance from the wearable electronic device to the real-world object increases.

8. An operation method of a wearable electronic device, the method comprising:
    display, through a display of the wearable electronic device, a virtual object at a first location through a glass member included in the wearable electronic device in a state in which the wearable electronic device is worn by a user;
    acquiring movement information of a first region of the wearable electronic device through a first sensor disposed in the first region and movement information of a second region of the wearable electronic device through a second sensor disposed in the second region, based on movement of the wearable electronic device, corresponding to movement of the user; and
    display, through the display, the virtual object at a second location different from the first location, based on the movement information of the first region and the movement information of the second region.

9. The method of claim 8, further comprising displaying, through the display, the virtual object at the second location, based on a difference between a first sensing value representing the movement information of the first region and a second sensing value representing the movement information of the second region exceeding a specified first value.

10. The method of claim 8, further comprising displaying, through the display, notification information for adjusting a wearing state of the wearable electronic device through the glass member, based on the difference between the first sensing value and the second sensing value exceeding a specified second value greater than the first value for the wearing state of the wearable electronic device.

11. The method of claim 8, further comprising:
    determining a direction of the movement of the user, based on the difference between the first sensing value representing the movement information of the first region and the second sensing value representing the movement information of the second region; and determining the second location, based on the direction of the movement.

12. The method of claim 8, further comprising:
displaying, through the display, guide information for determining a reference value with respect to effective movement of the wearable electronic device through the glass member in the state in which the wearable electronic device is worn by the user; and
acquiring movement information of the first region and movement information of the second region, based on the reference value.

13. The method of claim 8, further comprising determining the second location, based on a distance from the wearable electronic device to a real-world object corresponding to the virtual object.

14. The method of claim 8, further comprising configuring a distance between the first location and the second location to be smaller as the distance from the wearable electronic device to the real-world object increases.

15. A non-transitory computer-readable recording medium storing at least one instruction which, when executed, causes a wearable electronic device to perform operations comprising:
displaying, through a display of the wearable electronic device, a virtual object at a first location through a glass member included in the wearable electronic device in a state in which the wearable electronic device is worn by a user;
acquiring movement information of a first region of the wearable electronic device through a first sensor disposed in the first region and movement information of a second region of the wearable electronic device through a second sensor disposed in the second region, based on movement of the wearable electronic device corresponding to movement of the user; and
displaying, through the display, the virtual object at a second location different from the first location, based on the movement information of the first region and the movement information of the second region.

16. The non-transitory computer-readable recording medium of claim 15, wherein the operations further comprise displaying, through the display, the virtual object at the second location, based on a difference between a first sensing value representing the movement information of the first region and a second sensing value representing the movement information of the second region exceeding a specified first value.

17. The non-transitory computer-readable recording medium of claim 15, wherein the operations further comprise displaying, through the display, notification information for adjusting a wearing state of the wearable electronic device through the glass member, based on the difference between the first sensing value and the second sensing value exceeding a specified second value greater than the first value for the wearing state of the wearable electronic device.

18. The non-transitory computer-readable recording medium of claim 15, wherein the operations further comprise:
determining a direction of the movement of the user, based on the difference between the first sensing value representing the movement information of the first region and the second sensing value representing the movement information of the second region; and
determining the second location, based on the direction of the movement.

19. The non-transitory computer-readable recording medium of claim 15, wherein the operations further comprise:
displaying, through the display, guide information for determining a reference value with respect to effective movement of the wearable electronic device through the glass member in the state in which the wearable electronic device is worn by the user; and
acquiring movement information of the first region and movement information of the second region, based on the reference value.

20. The non-transitory computer-readable recording medium of claim 15, wherein the operations further comprise determining the second location, based on a distance from the wearable electronic device to a real-world object corresponding to the virtual object.

* * * * *